US012665192B2

(12) United States Patent
Kim et al.

(10) Patent No.: US 12,665,192 B2
(45) Date of Patent: Jun. 23, 2026

(54) INTERMETALLIC ANODE MATERIALS FOR LITHIUM-ION BATTERIES

(71) Applicant: Rivian IP Holdings, LLC, Plymouth, MI (US)

(72) Inventors: Soo Kim, Fremont, CA (US); Rubayyat Mahbub, Fremont, CA (US); Byoungchul You, Saratoga, CA (US); Cary Michael Hayner, Naperville, IL (US); Sookyung Jeong, San Jose, CA (US); Tae Kyoung Kim, Albany, CA (US); Ki Tae Park, Santa Clara, CA (US); Victor Prajapati, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 878 days.

(21) Appl. No.: 17/955,382

(22) Filed: Sep. 28, 2022

(65) Prior Publication Data

US 2025/0219067 A1 Jul. 3, 2025

(51) Int. Cl.
*H01M 4/40* (2006.01)
*H01M 4/131* (2010.01)
(Continued)

(52) U.S. Cl.
CPC ........... *H01M 4/405* (2013.01); *H01M 4/131* (2013.01); *H01M 4/133* (2013.01); *H01M 4/134* (2013.01); *H01M 4/362* (2013.01); *H01M 4/366* (2013.01); *H01M 4/381* (2013.01); *H01M 4/386* (2013.01); *H01M 4/463* (2013.01); *H01M 4/466* (2013.01); *H01M 4/583* (2013.01); *C01B 33/00* (2013.01); *C01G 5/006* (2013.01); *C01G 15/006* (2013.01); *C01P 2002/76* (2013.01);
(Continued)

(58) Field of Classification Search
CPC ...... H01M 4/463; H01M 4/466; H01M 4/381; H01M 4/386; H01M 4/583; H01M 4/133; H01M 4/134; H01M 4/131; H01M 4/362; H01M 2004/027; H01M 4/366
See application file for complete search history.

(56) References Cited

U.S. PATENT DOCUMENTS

| | | | | |
|---|---|---|---|---|
| 6,528,208 | B1 * | 3/2003 | Thackeray | H01M 4/386 429/231.95 |
| 2009/0142663 | A1 | 6/2009 | Takeuchi et al. | |

(Continued)

FOREIGN PATENT DOCUMENTS

| | | | |
|---|---|---|---|
| CN | 112290008 | * | 1/2021 |
| EP | 4037015 A1 | | 8/2022 |

OTHER PUBLICATIONS

Bennett, William R. (2012). "Considerations for Estimating Electrode Performance in Li-Ion Cells", 2012 IEEE Energytech Conferences.

(Continued)

*Primary Examiner* — Laura Weiner
(74) *Attorney, Agent, or Firm* — BAKERHOSTETLER

(57) ABSTRACT

Particular embodiments may provide an anode material, comprising a compound of formula $Li_2$—X—Y, wherein: X and Y are each independently a metal atom or a metalloid atom; the anode material has a discharge potential of less than about 0.4 V vs. Li/$Li^+$; and the molar ratio of Li:X:Y is 2:1:1.

19 Claims, 14 Drawing Sheets

(51) Int. Cl.

| | |
|---|---|
| ***H01M 4/133*** | (2010.01) |
| ***H01M 4/134*** | (2010.01) |
| ***H01M 4/36*** | (2006.01) |
| ***H01M 4/38*** | (2006.01) |
| ***H01M 4/46*** | (2006.01) |
| ***H01M 4/583*** | (2010.01) |
| *C01B 33/00* | (2006.01) |
| *C01G 5/00* | (2006.01) |
| *C01G 15/00* | (2006.01) |
| *H01M 4/02* | (2006.01) |

(52) U.S. Cl.

CPC ...... *C01P 2002/77* (2013.01); *C01P 2006/40* (2013.01); *H01M 2004/027* (2013.01); *H01M 4/46* (2013.01)

(56) References Cited

U.S. PATENT DOCUMENTS

| | | | |
|---|---|---|---|
| 2012/0263988 | A1 | 10/2012 | Obasih et al. |
| 2018/0351200 | A1 | 12/2018 | Zhamu et al. |
| 2019/0260066 | A1 | 8/2019 | Hu et al. |
| 2020/0208287 | A1 | 7/2020 | Yang et al. |

OTHER PUBLICATIONS

Leblanc, Dominic, et al. (Jan. 2022). "Advanced silicon-based electrodes for high-energy lithium-ion batteries", Chapter 11, Elsevier Inc. Silicon Anode Systems for Lithium-Ion Batteries, pp. 411-456, Located at: https://doi.org/10.1016/B978-0-12-819660-1.00005-0.

Nelson, P. A., et al. (Dec. 2012). "Modeling the Performance and Cost of Lithium-Ion Batteries for Electric-Drive Vehicles" Second Edition, Argonne, National Laboratory, Chemical Sciences and Engineering Division, located at: https://www.osti.gov.

Wu, Xiangkun, et al. (Jul. 17, 2019). "Safety Issues in Lithium Ion Batteries: Materials and Cell Design" Review article, Frontiers in Energy Research, vol. 7, Article 65, located at: https://doi.org/10.3389/fenrg.2019.00065.

Yourey, William, et al. (Jan. 5, 2021). "Design Considerations for Fast Charging Lithium Ion Cells for Nmc/ Mcmb Electrode Pairs", Batteries, MDPI, located at: https://doi.org/10.3390/batteries7010004.

Final Office Action mailed Mar. 27, 2023, for U.S. Appl. No. 17/936,333, filed Sep. 28, 2022, thirteen pages.

Non-Final Office Action mailed Dec. 15, 2022, for U.S. Appl. No. 17/936,333, filed Sep. 28, 2022, twelve pages.

Non-Final Office Action mailed Sep. 14, 2023, for U.S. Appl. No. 17/936,333, filed Sep. 28, 2022, sixteen pages.

* cited by examiner

1020

```
┌─────────────────────────┐        ┌─────────────────────────┐
│   Amass Initial Data Set│        │     Screen based on     │
│           1022          │───┐     │      practicality       │
└─────────────────────────┘   │     │           1032          │
             │                 │     └─────────────────────────┘
             ▼                 │                  │
┌─────────────────────────┐   │                  ▼
│     Screen based on     │   │     ┌─────────────────────────┐
│    compound formula     │   │     │     Screen based on     │
│     (e.g., Li-X-Y)      │   │     │  reversibility reaction │
│           1024          │   │     │           1034          │
└─────────────────────────┘   │     └─────────────────────────┘
             │                 │                  │
             ▼                 │                  ▼
┌─────────────────────────┐   │     ┌─────────────────────────┐
│     Screen based on     │   │     │  Categorize materials   │
│     synthesizability    │   │     │   based on over-        │
│           1026          │   │     │       Lithiation        │
└─────────────────────────┘   │     │           1036          │
             │                 │     └─────────────────────────┘
             ▼                 │                  │
┌─────────────────────────┐   │                  ▼
│     Screen based on     │   │     ┌─────────────────────────┐
│       conductivity      │   │     │  Categorize materials   │
│           1028          │   │     │       based on          │
└─────────────────────────┘   │     │     decomposition       │
             │                 │     │           1038          │
             ▼                 │     └─────────────────────────┘
┌─────────────────────────┐   │                  │
│     Screen based on     │   │                  ▼
│         voltage         │   │     ┌─────────────────────────┐
│           1030          │───┘     │     Screen based on     │
└─────────────────────────┘        │        capacity         │
                                    │           1034          │
                                    └─────────────────────────┘
```

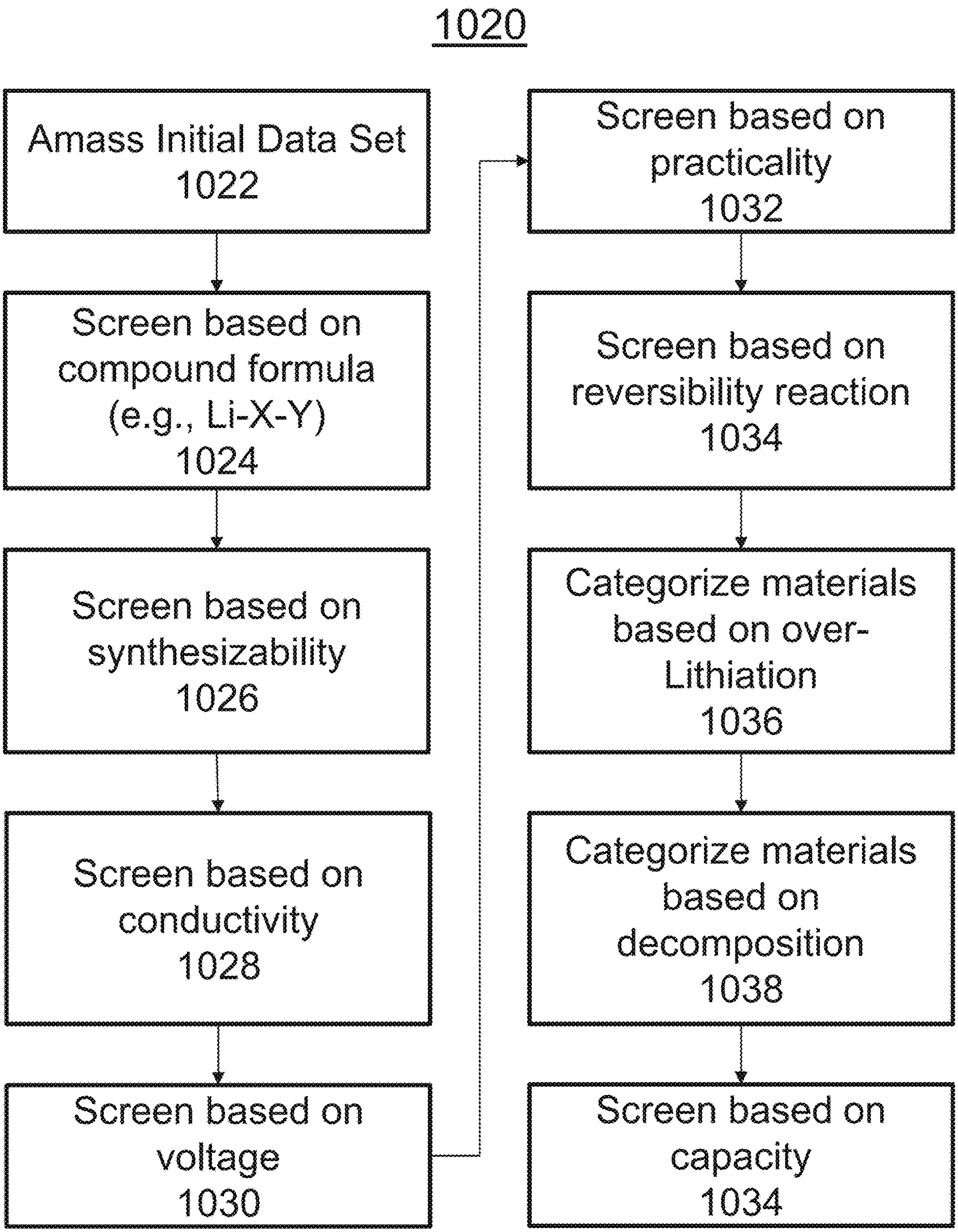

FIG. 11

INTERMETALLIC ANODE MATERIALS FOR LITHIUM-ION BATTERIES

INTRODUCTION

This disclosure generally relates to anode materials comprising intermetallic compounds, which are useful in lithium-ion batteries. The anode materials are expected to improve the performance of lithium-ion batteries comprising such anode materials. Also provided are methods for preparing the anode materials, as well as electrodes and electrochemical cells comprising the anode materials.

BRIEF SUMMARY

In one aspect, provided herein is an anode material, which may be useful in lithium-ion batteries. The anode material comprises an intermetallic compound of the formula $Li_2$—X—Y, wherein X and Y are each independently a metal atom (e.g., Ca) or a metalloid atom (e.g., Si). The anode material may have beneficial properties relative to conventional anode materials. For example, the anode material may allow for the production of lithium-ion batteries with higher energy densities than those containing conventional anode materials.

In a first aspect, provided herein is an anode material, comprising a compound of formula $Li_2$—X—Y, wherein: X and Y are each independently a metal atom or a metalloid atom; the anode material has a discharge potential of less than about 0.4 V vs. $Li/Li^+$; and the molar ratio of Li:X:Y is 2:1:1.

In some embodiments, X is Ca, Mg, or Al. In some embodiments, Y is Si, Ga, or Ag. In some embodiments, X is Ca, Mg, or Al; and Y is Si, Ga, or Ag. In some embodiments, the compound is $Li_2CaSi$, $Li_2MgGa$, $Li_2AlAg$, $Li_2MgSi$, or $Li_2AlGa$.

In some embodiments, the compound has a cubic unit cell. In some embodiments, the cubic unit cell has an $Fm\bar{3}m$ or $F\bar{4}3m$ space group.

In some embodiments, the energy above the convex hull ($E_{hull}$) of the compound is less than about 25 meV/atom.

In some embodiments, the compound has a bandgap ($E_g$) of less than about 1.2 eV.

In some embodiments, the anode material has a theoretical capacity of greater than about 372 mA h $g^{-1}$.

In some embodiments, the anode material does not comprise an over-lithiated form of the compound. In some such embodiments, the compound is not susceptible to side decomposition reactions upon discharging. In other such embodiments, the compound is susceptible to side decomposition reactions upon discharging.

In some embodiments, the anode material further comprises an over-lithiated form of the compound. In some such embodiments, the compound is not susceptible to side decomposition reactions upon discharging. In other such embodiments, the compound is susceptible to side decomposition reactions upon discharging.

In some embodiments, the anode material further comprises a de-lithiated form of the compound.

In some embodiments, the compound is $Li_2YIn$, $Li_2SrSn$, $Li_2CaSn$, $Li_2BaSi$, or $LiCa_2Al$. In some embodiments, the compound is $Li_2LaIn$, $LiYSi$, $Li_2LaSn$, $Li_2GaCu_3$, $Li_2ZnCu_3$, $LiAl_2Ni$, or $LiMg_2Zn$.

In another aspect, provided herein is a method for preparing an anode material, comprising a compound of formula $Li_2$—X—Y, wherein: X and Y are each independently a metal atom or a metalloid atom; the anode material has a discharge potential of less than about 0.4 V vs. $Li/Li^+$; and the molar ratio of Li:X:Y is 2:1:1; said method comprising one or more of thermal treatment, reaction of metal precursors, solution-based reaction, physical vapor deposition, molten-salt reaction, and electrochemical deposition.

In another aspect, provided herein is an electrode comprising the anode material of any of the preceding embodiments. In some embodiments, the electrode further comprises one or more additional materials selected from the group consisting of C, Si, SiC, and $SiO_x$ wherein X is less than or equal to 2. In some embodiments, the anode material is mixed with the one or more additional materials. In some embodiments, the electrode comprises a first layer comprising the anode material and a second layer adjacent the first layer comprising the one or more additional materials. In some embodiments, the anode material is coated with a layer of carbon, arranged in a nanoporous structure, or a combination thereof.

In another aspect, provided herein is an electrochemical cell comprising the anode material of any of the preceding embodiments.

In another aspect, provided herein is an electric vehicle system comprising the anode material of any of the preceding embodiments.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 11 illustrates an exemplary screening process in accordance with some embodiments disclosed herein;

DETAILED DESCRIPTION

Figure 1:
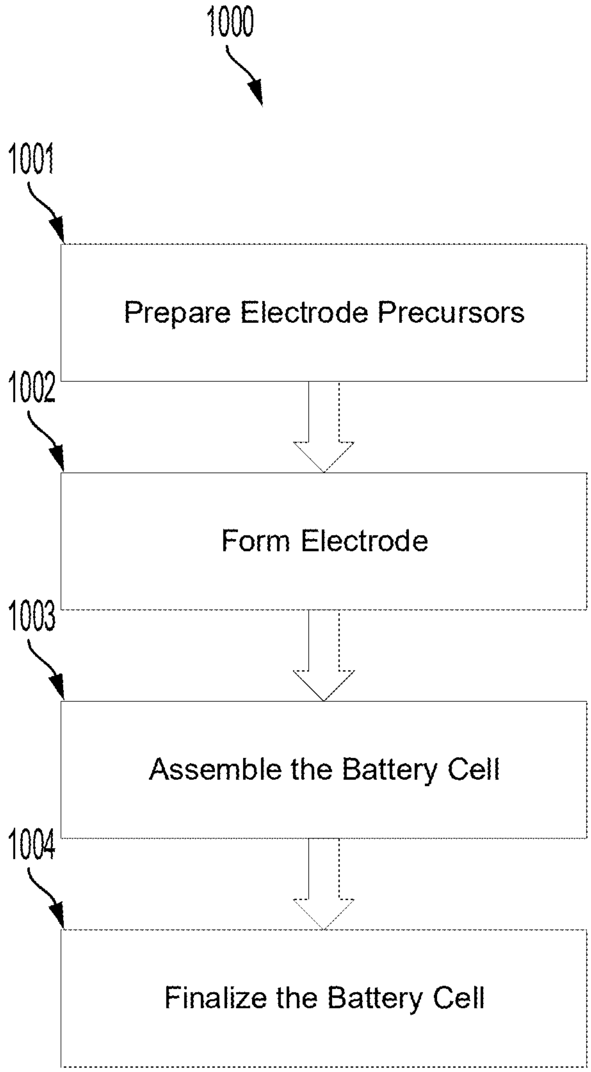
FIG. 1 illustrates a flow chart for a typical battery cell manufacturing process in accordance with some embodiments disclosed herein.

While lithium-ion batteries have become ubiquitous in modern technology, increasing energy density while simultaneously reducing cost is a persistent challenge. A focal point of developing next-generation high-performance lithium-ion batteries is the development of new anode materials with improved properties, for example high capacity (i.e., energy density), facile synthesizability, and acceptable conductivity. Providing new anode materials that exhibit these features without requiring expensive, rare, or toxic elements is a technical accomplishment necessary for advancing the field of energy storage and the many related areas of science and technology that depend on high-performance batteries.

In a first aspect, provided herein is an anode material, comprising a compound of formula $Li_2$—X—Y, wherein: X and Y are each independently a metal atom or a metalloid atom; the anode material has a discharge potential of less than about 0.4 V vs. $Li/Li^+$; the compound has a cubic unit cell; and the molar ratio of Li:X:Y is 2:1:1.

In some embodiments, X is Ca, Mg, or Al. In some embodiments, X is Ca. In some embodiments, X is Mg. In some embodiments, X is Al.

In some embodiments, Y is Si, Ga, or Ag. In some embodiments, Y is Si. In some embodiments, Y is Ga. In some embodiments, Y is Ag.

In some embodiments, X is Ca, Mg, or Al; and Y is Si, Ga, or Ag. In some embodiments, X is Ca and Y is Si. In some embodiments, X is Ca and Y is Ga. In some embodiments, X is Ca and Y is Ag. In some embodiments, X is Mg and Y is Si. In some embodiments, X is Mg and Y is Ga. In some embodiments, X is Mg and Y is Ag. In some embodiments, X is Al and Y is Si. In some embodiments, X is Al and Y is Ga. In some embodiments, X is Al and Y is Ag.

In some embodiments, X and Y are one of Ir, Pt, Os, Rh, Au, Pd, Ru, TI, Tb, Gd, Sm, Ho, Yb, Nd, Pr, Pm, Pb, Hg, Th, Cd, Tc, and Be. In some embodiments, X is Ca and Y is Sn. In some embodiments, X is Fe and Y is Ge. In some embodiments, X is Co and Y is Ge. In some embodiments, X is Yttrium (Y) and Y is In. In some embodiments, X is Si and Y is B. In some embodiments, X is Ga and Y is Ni. In some embodiments, X is Ce and Y is Si. In some embodiments, X is Mg and Y is Si. In some embodiments, X is Cu and Y is Ge. In some embodiments, X is Ca and Y is In.

In some embodiments, X is Al and Y is one of Ni, Cu, Ag, and Ga. In some embodiments, X is Ba and Y is one of Si and Na. In some embodiments, X is Ca and Y is one of Si, Sn, Ga, Al, and In. In some embodiments, X is Ce and Y is Si. In some embodiments, X is Co and Y is Si. In some embodiments, X is Ga and Y is one of Ni and Cu. In some embodiments, X La and Y is one of In and Sn. In some embodiments, X is Mg and Y is one of Ga, Zn, Ag, and Si. In some embodiments, X is Si and Y is Ni. In some embodiments, X is Sr and Y is Sn. In some embodiments, X is Yttrium (Y) and Y is one of Al, In, and Si. In some embodiments, X is Zn and Y is one of Ni and Cu.

In some embodiments, the compound is $Li_2CaSi$, $Li_2MgGa$, $Li_2AlAg$, $Li_2MgSi$, or $Li_2AlGa$. In some embodiments, the compound is $Li_2CaSi$. In some embodiments, the compound is $Li_2MgGa$. In some embodiments, the compound is $Li_2AlAg$. In some embodiments, the compound is $Li_2MgSi$. In some embodiments, the compound is $Li_2AlGa$.

In some embodiments, the crystal structure may deviate from a cubic symmetry. In a cubic crystal system, the lengths, a, b, and e of the three cell edges meeting at a vortex in 3-dimensional space are equal to one another; and, the angles between those edges, $\alpha$, $\beta$, and $\gamma$ are 90°. These values, a, b, c, $\alpha$, $\beta$, and $\gamma$, so called lattice parameters or lattice constants, determine the geometry of the unit cell in a crystal lattice system. Depending on the intentional changes for optimization including not limited to optimizing its chemistry, composition, substitution, doping, synthesis conditions, etc., the crystal system may be changed to an orthorhombic symmetry, a triclinic symmetry, a monoclinic symmetry, a tetragonal symmetry, a trigonal symmetry, or a hexagonal symmetry. In some embodiments, the unit cell has an orthorhombic symmetry, where $a \neq b \neq c$ and $\alpha=\beta=\gamma=90°$. In some embodiments, the unit cell has a triclinic symmetry, where $a \neq b \neq c$ and all angles$\neq$90°. In some embodiments, the unit cell has a monoclinic symmetry, where $a \neq b \neq c$ and angles between a &b($\gamma$) and b &c($\alpha$) are 90°, but angle between c and a ($\beta$) is greater than 90°. In some embodiments, the unit cell has a tetragonal symmetry, where $a=b \neq c$ and $\alpha=\beta=\gamma=90°$. In some embodiments, the unit cell has a trigonal symmetry, where $a=b=c$ and $\alpha=\beta=\gamma \neq 90°$. In some embodiments, the unit cell has a hexagonal symmetry, where $a=b \neq c$, $\alpha=\beta=90°$, and $\gamma=120°$.

In some embodiments, the cubic unit cell has an Fm$\bar{3}$m or F$\bar{4}$3m space group. In some embodiments, the cubic unit cell has an Fm$\bar{3}$m space group. In some embodiments, the cubic unit cell has an F$\bar{4}$3m space group. These are just two space groups out of a total of 36 cubic space groups. Depending on the packing of atoms in the unit cell, it may deviate its space group, other than Fm$\bar{3}$m or F$\bar{4}$3m symmetry. In some embodiments, the cubic unit cell has one of the following cubic space groups: P23, F23, I23, P$2_1$3. I$2_1$3, Pm$\bar{3}$, Pn$\bar{3}$, Fm $\bar{3}$, Fd$\bar{3}$, Im$\bar{3}$, Pa$\bar{3}$, Ia$\bar{3}$, P432, P$4_2$32, F432, F$4_1$32, I432, P$4_3$32, P$4_1$32, I$4_1$32, P$\bar{4}$3m, F$\bar{4}$3m, I$\bar{4}$3m, P$\bar{4}$3n, F$\bar{4}$3c, I$\bar{4}$3d, Pm$\bar{3}$m, Pn$\bar{3}$n, Pm$\bar{3}$n, Pn$\bar{3}$m, Fm$\bar{3}$m, Fm$\bar{3}$c, Fd$\bar{3}$m, Fd$\bar{3}$c, Im $\bar{3}$m, and Ia$\bar{3}$d.

In some embodiments, the energy above the convex hull ($E_{hull}$) of the compound is less than about 25 meV/atom, less than about 20 meV/atom, less than about 15 meV/atom, less than about 10 meV/atom, or less than about 5 meV/atom. In some embodiments, the energy above the convex hull ($E_{hull}$) of the compound is less than about 25 meV/atom. In some embodiments, the energy above the convex hull ($E_{hull}$) of the compound is less than about 20 meV/atom. In some embodiments, the energy above the convex hull ($E_{hull}$) of the compound is less than about 0.15 meV/atom. In some embodiments, the energy above the convex hull ($E_{hull}$) of the compound is less than about 10 meV/atom. In some embodiments, the energy above the convex hull ($E_{hull}$) of the compound is less than about 5 meV/atom. When the energy above the convex hull ($E_{hull}$) is 0, the compound is thermodynamically stable. When the energy above the convex hull ($E_{hull}$) is less than about 25 meV/atom, the compound is nearly stable and has a very high likely successful to be stabilized at room temperature, where the thermal energy, $k_BT$, at room temperature is 25.7 meV. Here, kB is the Boltzmann constant ($8.617333262\times10^{-5}$ eV/K) and T is the temperature (here, room temperature, 298.15 K). The value of $k_BT$ is referring to the probability of finding a system in a state of energy E, given that it is in a surrounding environment at temperature T. In other words, if the value of $E_{hull}$ is less than about 25 meV/atom, there is a likelihood to find the corresponding compound at room temperature (i.e., 25° C.).

In some embodiments, the compound has a bandgap ($E_g$) of less than about 1.2 eV, less than about 1.0 eV, less than about 0.5 eV, or less than about 0.25 eV. In some embodiments, the compound has a bandgap (hg) of less than about 1.2 eV. In some embodiments, the compound has a bandgap ($E_g$) of less than about 1.0 eV. In some embodiments, the compound has a bandgap ($E_g$) of less than about 0.5 eV. In some embodiments, the compound has a bandgap ($E_g$) of less than about 0.25 eV. For anode materials, it is important that the compound has a bandgap that corresponds to either a zero bandgap (metallic) or semi-conducting (i.e., less than about 1.2 eV), or any $E_g$ value in between 0 to 1.2 eV.

In some embodiments, the anode material has a theoretical capacity of greater than about 200 mA h $g^{-1}$, greater than about 250 mA h $g^{-1}$, greater than about 300 mA h $g^{-1}$, or greater than about 372 mA h $g^{-1}$. In some embodiments, the anode material has a theoretical capacity of greater than about 200 mA h $g^{-1}$. In some embodiments, the anode material has a theoretical capacity of greater than about 250 mA h $g^{-1}$. In some embodiments, the anode material has a theoretical capacity of greater than about 300 mA h $g^{-1}$. In some embodiments, the anode material has a theoretical capacity of greater than about 372 mA h $g^{-1}$. Graphite is the most commonly used anode material in Li-ion batteries, which has a theoretical capacity of 372 mA h $g^{-1}$.

A compound may become over-lithiated if it is capable of reaction with additional $Li^+$ ions. Here, a compound is over-lithiated if it takes more lithium ions relative to its equilibrium reaction. The over-lithiation reaction between the compound and the additional Lit ions may be reversible, if the kinetic reaction is the dominating factor in a given electrochemical system that it takes time (t) to reach its thermodynamic equilibrium (i.e., as $t\rightarrow\infty$). In contrast, the reaction between the compound and the additional Lit ions may be irreversible, where reaching thermodynamic equilibrium is the dominating factor. In an irreversible reaction, the compound loses capacity in an electrochemical cell over the extended cycling performance. An example of a compound capable of over-lithiation is $BaLi_2Si$, which may under certain conditions react with additional $Li^+$ ions in a reaction such as 0.688 $Li^+$0.312 $BaLi_2Si\rightarrow$0.062 $Li_{21}Si_5$+ 0.312 Ba. In some embodiments, the anode material does not comprise an over-lithiated form of the compound. In some embodiments, the anode material comprises an over-lithiated form of the compound.

A compound may be susceptible to side decomposition reactions under operating conditions. Specifically, upon discharging, a de-lithiated form of a compound may be susceptible to side decomposition reaction. A decomposition reaction may be reversible or irreversible. An example of a compound that may undergo a decomposition reaction is $LiAlNi_2$, whose de-lithiated form ($AlNi_2$) may under certain conditions decompose in a reaction such as $AlNi_2\rightarrow$0.25 $Al_3Ni_5$+0.25 $AlNi_3$. In some embodiments, the anode material comprises a decomposed form of the compound. In some embodiments, the anode material comprises a de-lithiated form of the compound.

In any of the preceding embodiments, the compound is not susceptible to side decomposition reactions upon discharging. In some such embodiments, the compound is susceptible to side decomposition reactions upon discharging. In some embodiments, the anode material does not comprise an over-lithiated form of the compound, and the compound is not susceptible to side decomposition reactions upon discharging. In some embodiments, the anode material does not comprise an over-lithiated form of the compound, and the compound is susceptible to side decomposition reactions upon discharging.

In some embodiments, the anode material comprises an over-lithiated form of the compound, and the compound is not susceptible to side decomposition reactions upon discharging. In some embodiments, the anode material comprises an over-lithiated form of the compound, and the compound is susceptible to side decomposition reactions upon discharging.

In some embodiments, the anode material does not comprise an over-lithiated form of the compound, and the compound is not susceptible to side decomposition reactions upon discharging. In some such embodiments, the compound is $Li_2CaSi$.

In some embodiments, the anode material comprises an over-lithiated form of the compound, and the compound is not susceptible to side decomposition reactions upon discharging. In some such embodiments, the compound is $Li_2MgGa$.

In some embodiments, the anode material does not comprise an over-lithiated form of the compound, and the compound is susceptible to side decomposition reactions upon discharging.

In some embodiments, the anode material comprises an over-lithiated form of the compound, and the compound is susceptible to side decomposition reactions upon discharging. In some such embodiments, the compound is $Li_2AlAg$, $Li_2MgSi$, or $Li_2AlGa$. In some such embodiments, the compound is $Li_2AlAg$. In other such embodiments, the compound is $Li_2MgSi$. In other such embodiments, the compound is $Li_2AlGa$.

Methods of Preparing an Anode Material

In another aspect, provided herein is a method for preparing an anode material, comprising a compound of formula $Li_2$—X—Y, wherein: X and Y are each independently a metal atom or a metalloid atom; the anode material has a discharge potential of less than about 0.4 V vs. $Li/Li^+$; the compound has a cubic unit cell; and the molar ratio of Li:X:Y is 2:1:1. Methods for preparing the anode materials include any method known in the art. Conventional synthesis involves a direct reaction of the desired element at high temperature, which is reducing environment. Particular methods that can be used include, without limitation, thermal treatment or reaction of metal precursors, solution-based reaction (ex-situ), physical vapor deposition (e.g., sputtering), molten-salt reaction, and in-situ/electrochemical deposition where metal/metalloid cationic salts in an electrolyte are chemically or electrochemically reduced onto an electrode. Some intermetallic films can be deposited and formed by chemically bonding electropositive and electronegative metals with a specific composition and crystalline structure, by co-deposition process at high temperatures.

Battery Cells, Battery Modules, Battery Packs, and Electric Vehicle Systems

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the electrodes, densified electrodes, components, systems, methods, apparatuses, devices, compositions, etc. described herein can be implemented into the battery cells, battery modules, battery packs, and methods of making these battery cells, battery modules, and battery packs.

FIG. 1 illustrates a flow chart for a typical battery cell manufacturing process 1000. These steps are not exhaustive and other battery cell manufacturing processes can include additional steps or only a subset of these steps. At step 1001, the electrode precursors (e.g., binder, active material, conductive carbon additive) can be prepared. In some embodiments, this step can include mixing electrode materials (e.g., active materials) with additional components (e.g., binders, solvents, conductive additives, etc.) to form an electrode slurry. In some embodiment, this step can include synthesizing the electrode materials themselves.

At step 1002, the electrode can be formed. In some embodiments, this step can include coating an electrode slurry on a current collector. In some embodiments, the electrode or electrode layer can include electrode active materials, conductive carbon material, binders, and/or other additives. In some embodiments, the electrode active materials can include cathode active materials. In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium cobalt oxide (LCO), lithium manganese oxide (LMO), lithium metal phosphates like lithium iron phosphate ("LFP"), Lithium iron manganese phosphate ("LMFP"), and combinations thereof.

Figure 2A:
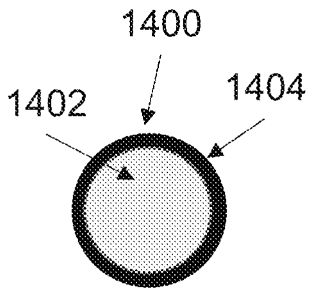
FIG. 2A illustrates an exemplary carbon-coated intermetallic particle in accordance with some embodiments disclosed herein.
Figure 2B:
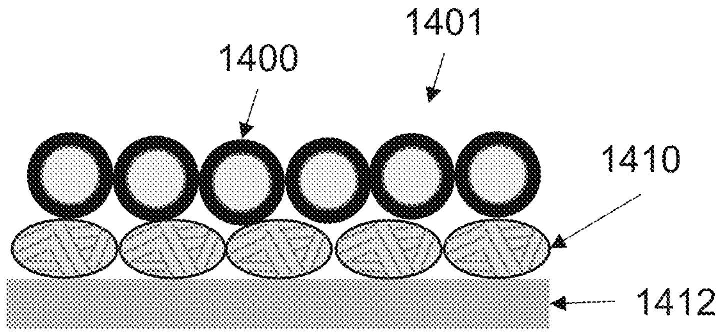
FIG. 2B illustrates an exemplary dual layered electrode configuration in accordance with some embodiments disclosed herein.
Figure 2C:
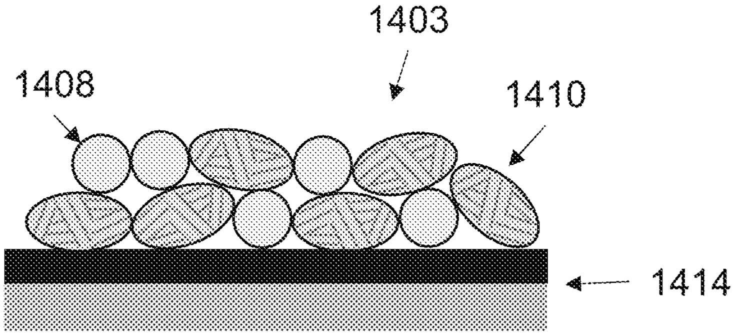
FIG. 2C illustrates an exemplary mixed electrode configuration between graphite anode and intermetallic materials in a carbon-coated current collector foil, in accordance with some embodiments disclosed herein.
Figure 2D:
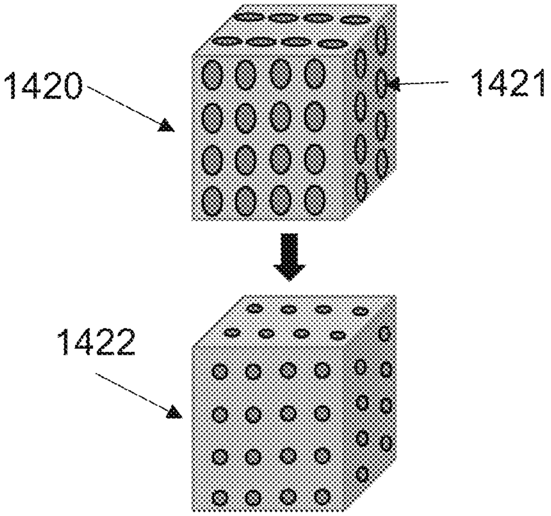
FIG. 2D illustrates an exemplary nanoporous structure for an electrode in accordance with some embodiments disclosed herein.

FIGS. 2A-D show various particle and electrode structures, which can be utilized to incorporate any of the material compounds disclosed herein into the anode for an electrode of an electrochemical cell. One example manner of incorporating these materials is shown in FIG. 2A which depicts a carbon-coated intermetallic (IM) particle 1400. The IM particle 1400 is coated via a layer 1404 of carbon. A number of carbon-coated particles like the particle 1400 can be incorporated into various mixtures, as shown in FIGS. 2B-C. FIG. 2B depicts a dual layered electrode configuration 1401, including the first layer of graphite anode 1410 and the second (top) layer of carbon-coated IM particles 1400 onto a current collector 1414 such as Cu foil. In one or more examples, the carbon-coated IM particles 1400 may act as a lithiophilic layer, attracting excess lithium ions transferred from the cathode electrode. FIG. 2C depicts a mixed electrode 1403 including a mixture of graphite 1410 and IM particles 1408 with a carbon-coated current collector 1414 that can help improving both IM particle adhesion and overall electrode conductivity. The IM particles 1408 can be carbon-coated, such as the carbon-coated IM particle 1400. Another exemplary manner of incorporating on a nanoporous structure, as shown in FIG. 2D, which may beneficially counteract the tendency of the material to over-lithiate and to reduce the severe volume change of active materials. The non-lithiated structure 1420 includes a number of nanopores 1421. In the lithiated structure 1422, the nanopores 1421 accommodate volume expansion of the structure, where a vacant space in the nanopores 1421 prevent the severe electrode volume change even in the case of a large amount of lithiation. The nanoporous structure shown in FIG. 2D can be incorporated into a stand-alone electrode configuration shown in FIG. 2A or the electrode configurations 1401 and 1403 shown in FIGS. 2B and 2C.

In some embodiments, the electrode active materials can include anode active materials as described in various embodiments herein. In some embodiments, an anode material can be formed within a current collector material. For example, an electrode can include a current collector (e.g., a copper foil) with an in situ-formed anode (e.g., an anode material as described in various embodiments herein) on a surface of the current collector facing the separator or solid-state electrolyte. In such examples, the assembled cell may not comprise an anode active material in an uncharged state.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof. In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

In some embodiments, solid electrolyte materials of the solid electrolyte layer can include inorganic solid electrolyte materials such as oxides, sulfides, phosphides, halides, ceramics, solid polymer electrolyte materials, hybrid solid state electrolytes, or glassy electrolyte materials, among others, or in any combinations thereof. In some embodiments, the solid electrolyte layer can include a polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$(A=Ca, Sr, Ba and X=Nb, Ta), lithium phosphorous oxy-nitride ($Li_xPO_yN_2$), among others, or in any combinations thereof. In some embodiments, the solid electrolyte layer can include a glassy, ceramic and/or crystalline electrolyte material such as $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, lithium phosphorous oxy-nitride ($Li_xPO_yN_2$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), Lithium lanthanum zirconium oxide ($La_3Li_7O_{12}Zr_2$), LiSiCON($Li_{2+2x}Zn_{1-x}GeO_4$), lithium lanthanum titanate ($Li_{3x}La_{2/3-x}TiO_3$) and/or sulfide-based lithium argyrodites with formula $Li_6PS_5X$(X=Cl, Br) like $Li_6PS_5Cl$, among others, or in any combinations thereof. Furthermore, solid state polymer electrolyte materials can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), and PEG, among others, or in any combinations thereof.

At step 1003, the battery cell can be assembled. After the electrodes, separators, and/or electrolytes have been prepared, a battery cell can be assembled/prepared. In this step, the separator and/or an electrolyte layer can be assembled between the anode and cathode layers to form the internal structure of a battery cell. These layers can be assembled by a winding method such as a round winding or prismatic/flat winding, a stacking method, or a z-folding method.

The assembled cell structure can then be inserted into a cell housing which is then partially or completed sealed. In addition, the assembled structure can be connected to terminals and/or cell tabs (via a welding process). For battery cells utilizing a liquid electrolyte, the housed cell with the electrode structure inside it can also be filled with electrolyte and subsequently sealed.

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 0.5 M.

Figure 3:
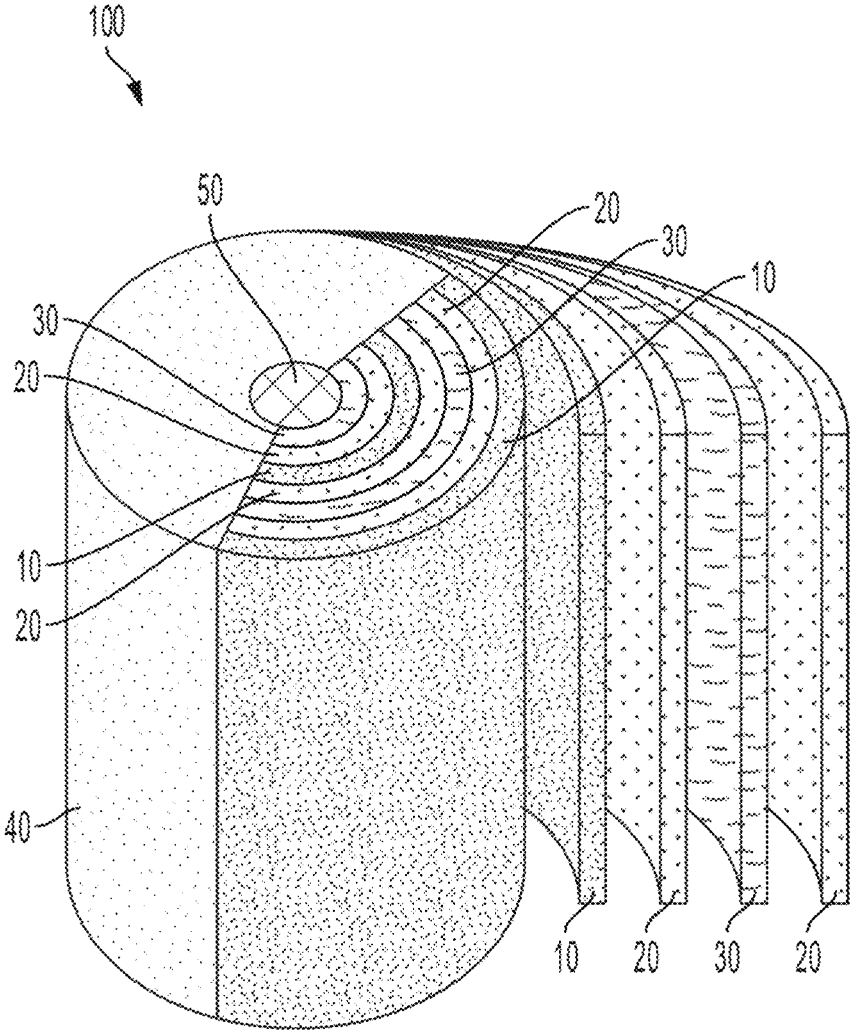
FIG. 3 depicts an illustrative example of a cross sectional view of a cylindrical battery cell in accordance with some embodiments disclosed herein.

FIG. 3 depicts an illustrative example of a cross sectional view of a cylindrical battery cell 100. The cylindrical battery cell can include layers (e.g., sheet-like layers) of anode layers 10, separator and/or electrolyte layers 20, and cathode layers 30.

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, separator/electrolyte layers) can be sandwiched, rolled up, and/or packed into a cavity of a cylinder-shaped casing 40 (e.g., a metal can). The casings/housings can be rigid such as those made from metallic or hard-plastic, for example. In some embodiments, a separator layer (and/or electrolyte layer) 20 can be arranged between an anode layer 10 and a cathode layer 30 to separate the anode layer 20 and the cathode layer 30. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 20 can prevent contact between the anode and cathode layers while facilitating ion (e.g., lithium ions) transport in the cell. The battery cell can also include at least one terminal 50. The at least one terminal can be electrical contacts used to connect a load or charger to a battery cell. For example, the terminal can be made of an electrically conductive material to carry electrical current from the battery cell to an electrical load, such as a component or system of an electric vehicle as discussed further herein.

Figure 4:
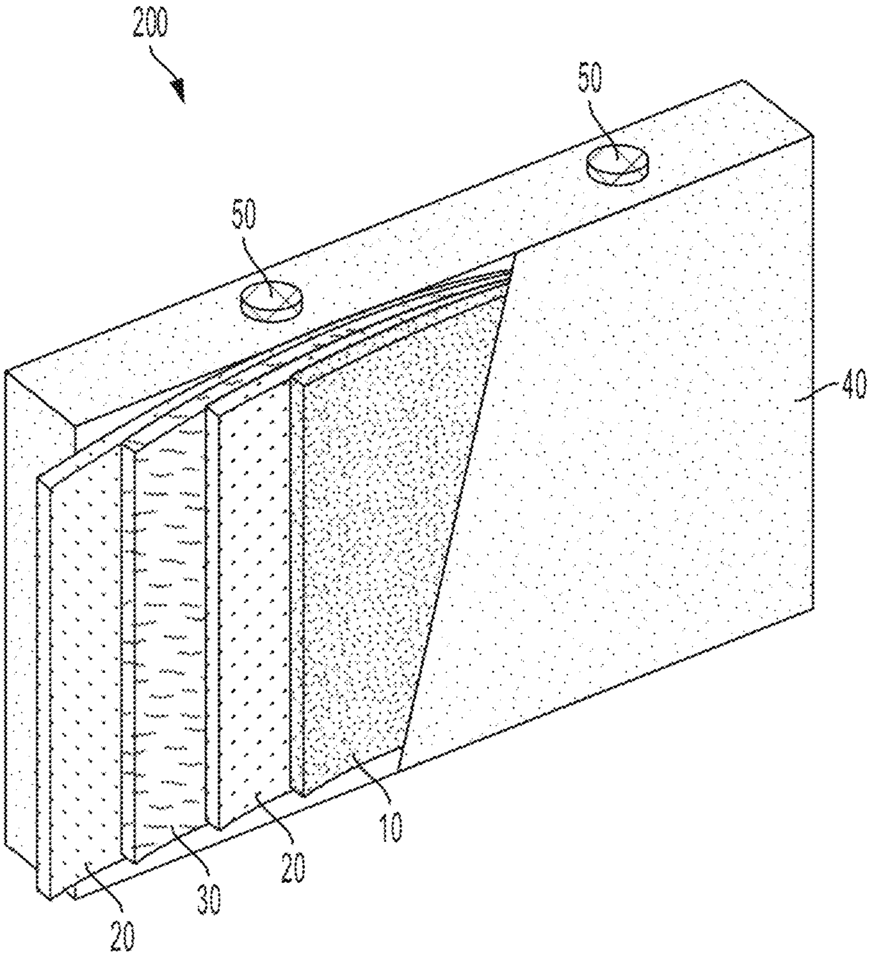
FIG. 4 depicts an illustrative example of a cross sectional view of a prismatic battery cell in accordance with some embodiments disclosed herein.

FIG. 4 depicts an illustrative example of a cross sectional view of a prismatic battery cell 200. The prismatic battery cell can include layers (e.g., sheet-like layers) of anode layers 10, separator and/or electrolyte layers 20, and cathode layers 30. Similar to the cylindrical battery cell, the layers of a prismatic battery cell can be sandwiched, rolled, and/or pressed to fit into cubic or rectangular cuboid (e.g., hyper-rectangle) shaped casing/housing 40. In some embodiments, the layers can be assembled by layer stacking rather than jelly rolling. In some embodiments, the casing or housing can be rigid such as those made from a metal and/or hard-plastic. In some embodiments, the prismatic battery cell 200 can include more than one terminal 50. In some embodiments, one of these terminals can be the positive terminal and the other a negative terminal. These terminals can be used to connect a load or charger to the battery cell.

Figure 5:
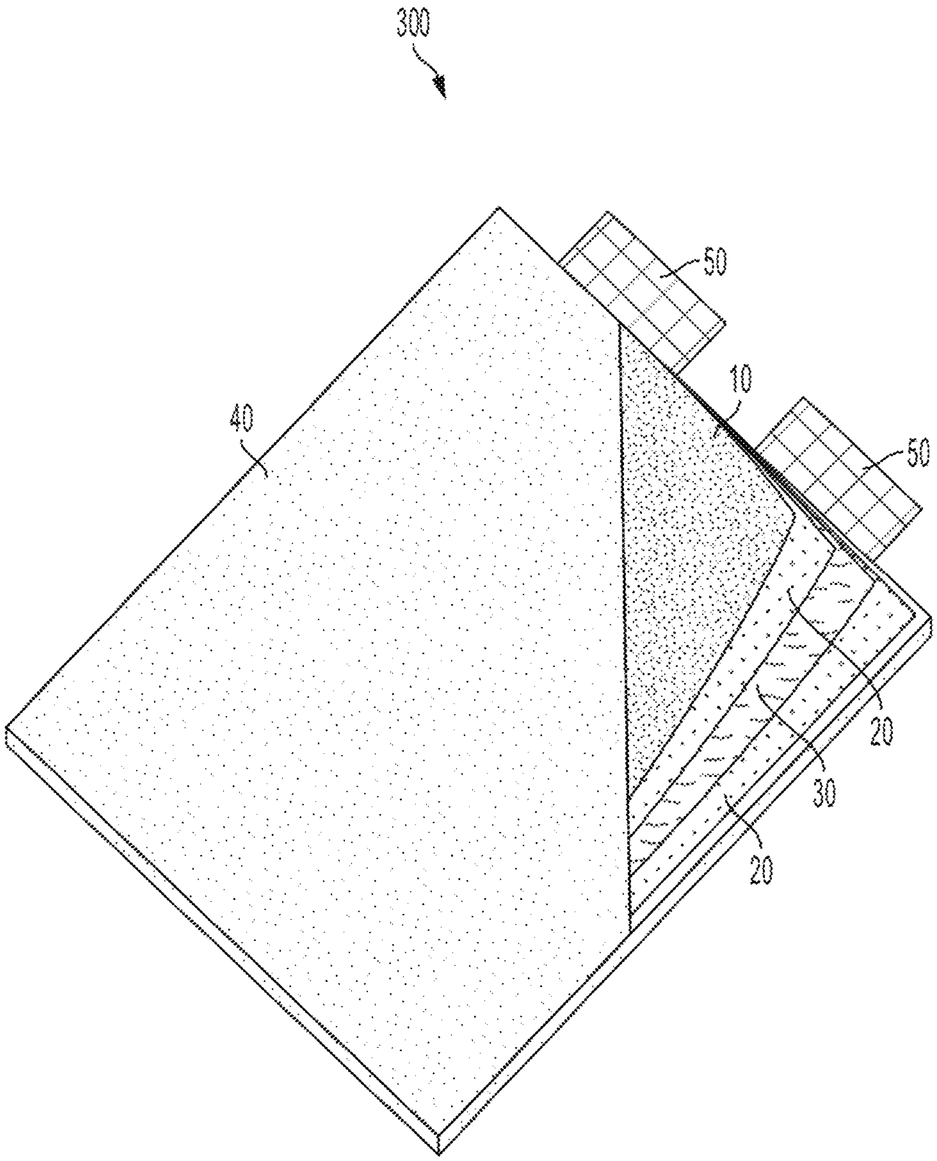
FIG. 5 depicts an illustrative example of a cross section view of a pouch battery cell in accordance with some embodiments disclosed herein.

FIG. 5 depicts an illustrative example of a cross section view of a pouch battery cell 300. The pouch battery cells do not have a rigid enclosure and instead use a flexible material for the casing/housing 40. This flexible material can be, for example, a sealed flexible foil. The pouch battery cell can include layers (e.g., sheet-like layers) of anode layers 10, separator and/or electrolyte layers 20, and cathode layers 30. In some embodiments, these layers are stacked in the casing/housing. In some embodiments, the pouch battery cell 200 can include more than one terminal 50. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 1004, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 6:
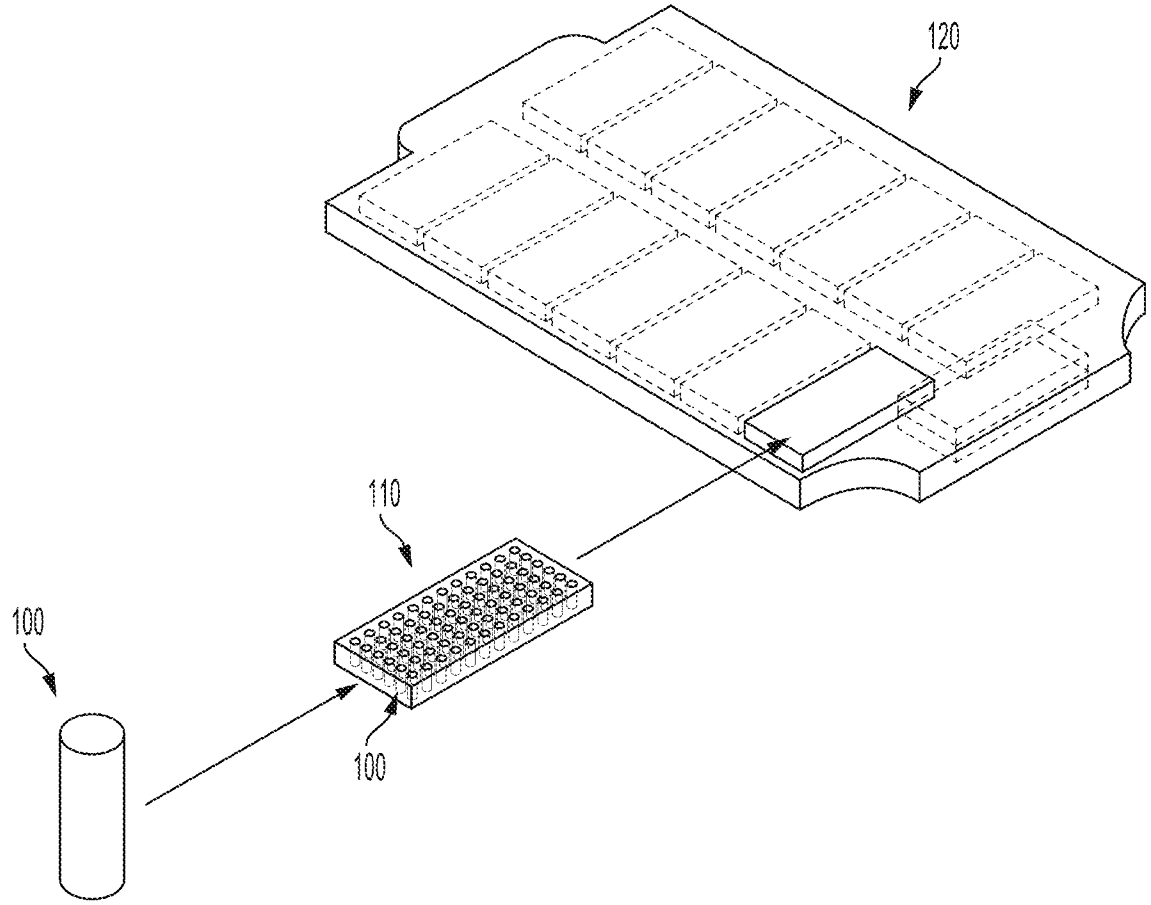
FIG. 6 illustrates cylindrical battery cells being inserted into a frame to form a battery module and pack in accordance with some embodiments disclosed herein.
Figure 7:
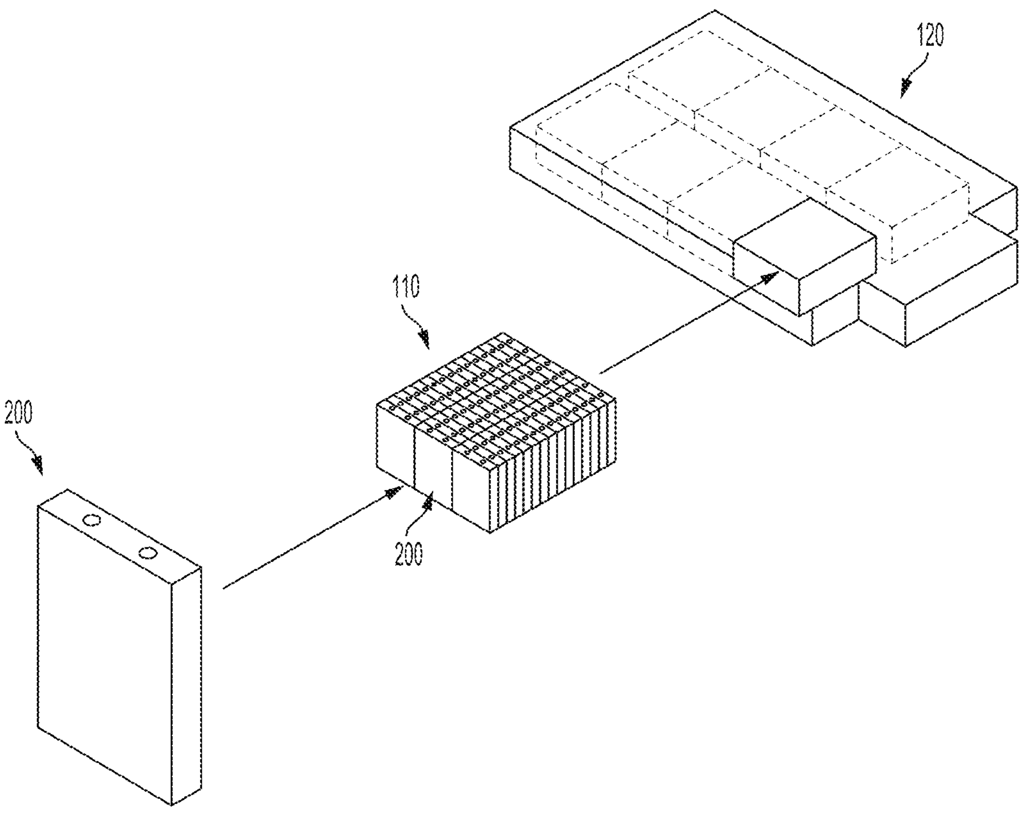
FIG. 7 illustrates prismatic battery cells being inserted into a frame to form a battery module and pack in accordance with some embodiments disclosed herein.
Figure 8:
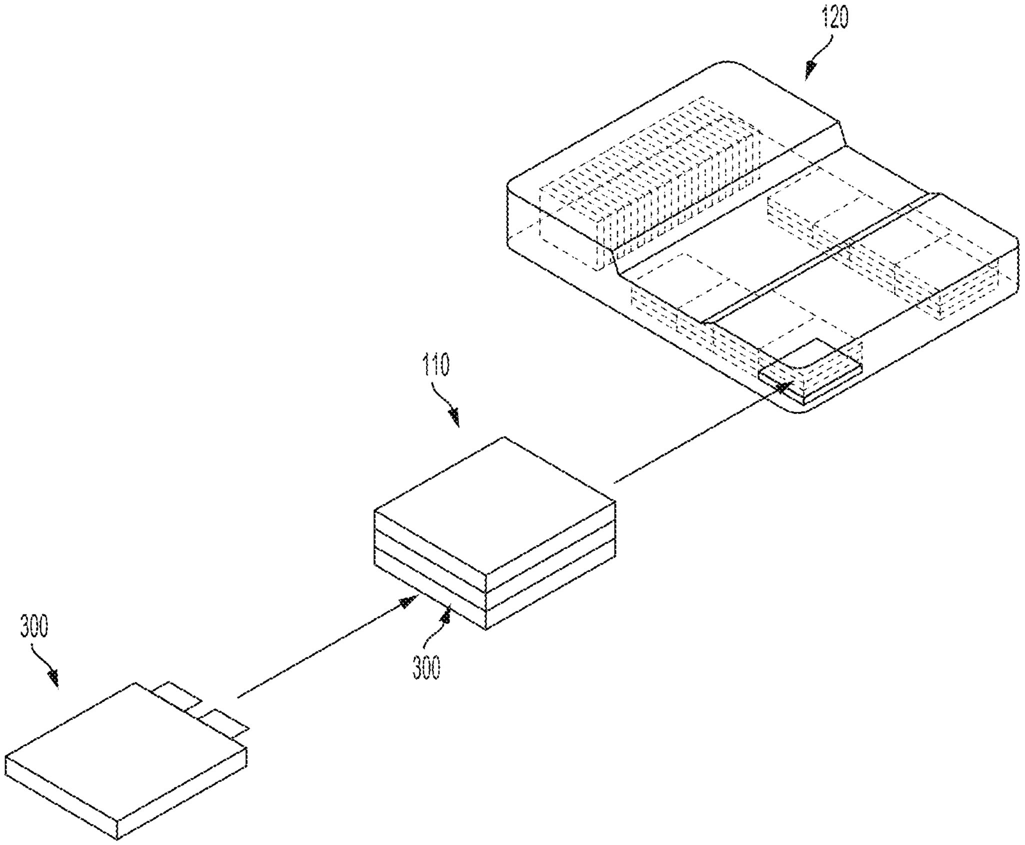
FIG. 8 illustrates pouch battery cells being inserted into a frame to form a battery module and pack in accordance with some embodiments disclosed herein.

A plurality of battery cells (100, 200, and/or 300) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 6 illustrates cylindrical battery cells 100 being inserted into a frame to form battery module 112. FIG. 7 illustrates prismatic battery cells 200 being inserted into a frame to form battery module 112. FIG. 8 illustrates pouch battery cells 300 being inserted into a frame to form battery module 112. In some embodiments, the battery pack may not include modules. For example, the battery pack can have a "module-free" or cell-to-pack configuration wherein battery cells are arranged directly into a battery pack without assembly into a module.

A plurality of the battery modules 112 can be disposed within another housing, frame, or casing to form a battery pack 120 as shown in FIGS. 6-8. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 6-8 illustrates three differently shaped battery packs 120. As shown in FIGS. 6-8, the battery packs 120 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 9:
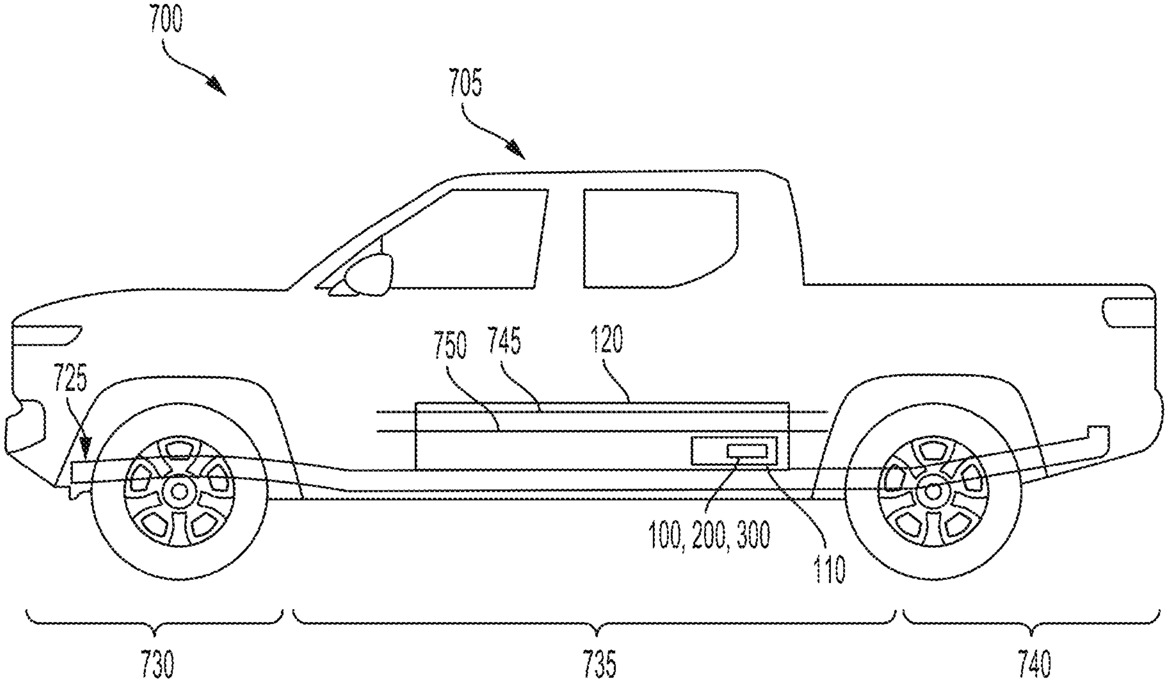
FIG. 9 illustrates an example of a cross sectional view of an electric vehicle that includes at least one battery pack in accordance with some embodiments disclosed herein.

FIG. 9 illustrates an example of a cross sectional view 700 of an electric vehicle 705 that includes at least one battery pack 120. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 705 can be installed with a battery pack 120 that includes battery modules 112 with battery cells (100, 200, and/or 300) to power the electric vehicles. The electric vehicle 705 can include a chassis 725 (e.g., a frame, internal frame, or support structure). The chassis 725 can support various components of the electric vehicle 705. In some embodiments, the chassis 725 can span a front portion 730 (e.g., a hood or bonnet portion), a body portion 735, and a rear portion 740 (e.g., a trunk, payload, or boot portion) of the electric vehicle 705. The battery pack 120 can be installed or placed within the electric vehicle 705. For example, the battery pack 120 can be installed on the chassis 725 of the electric vehicle 705 within one or more of the front portion 730, the body portion 735, or the rear portion 740. In some embodiments, the battery pack 120 can include or connect with at least one busbar, e.g., a current collector element. For example, the first busbar 745 and the second busbar 750 can include electrically conductive material to connect or otherwise electrically couple the battery pack 120 (and/or battery modules 112 or the battery cells 100, 200, and/or 300) with other electrical components of the electric vehicle 705 to provide electrical power to various systems or components of the electric vehicle 705. In some embodiments, battery pack 120 can also be used as an energy storage system to power a building, such as a residential home or commercial building instead of or in addition to an electric vehicle.

EXAMPLES

General. Data-driven materials screening methodologies can be used to identify materials suitable for developing new intermetallic anode materials. Data-driven screening methods can utilize machine-learning (ML) algorithms to screen materials and identify those materials having improved properties relative to graphite.

Figure 10:
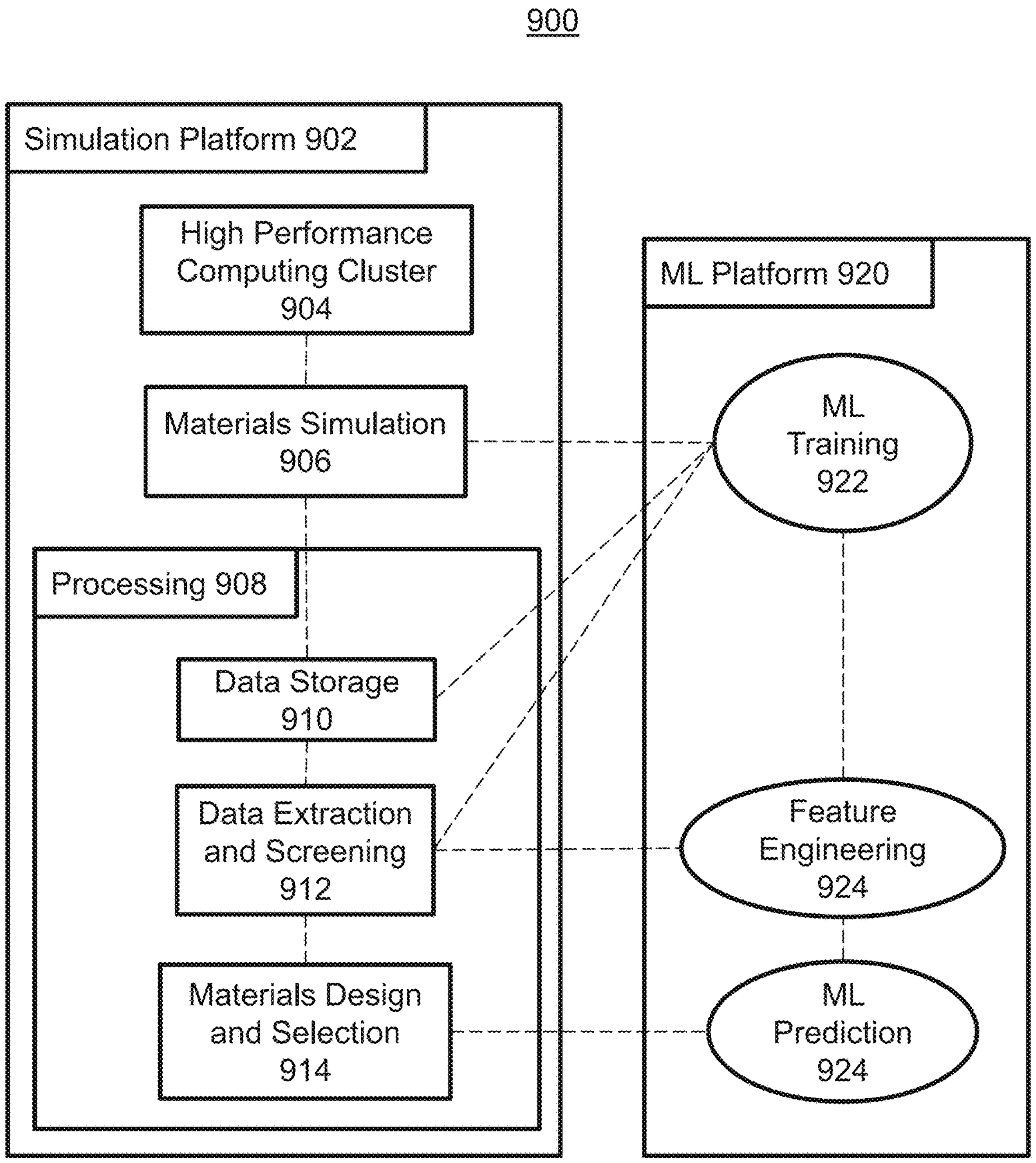
FIG. 10 illustrates an exemplary computing system for implementing data-driven materials screening methodologies in accordance with some embodiments disclosed herein.

FIG. 10 depicts an exemplary high performance computing system 900 for implementing the data-driven materials screening methodologies disclosed herein. The system 900 can include a simulation platform 902 and a ML platform 920. The simulation platform 902 uses a high performance computing cluster 904 in order to perform a materials simulation 906. The data processing 908 may be manual, semi-automatic, and/or automatic. The data processing 908 loads the materials data from a data storage 910, executes data extraction and screening 912, followed by materials design and selection 914. The ML platform 920 is composed of a large set of trained data set via ML training 922, using one or more of the materials simulation module 906, the data storage 910, the data extraction and screening module 912, and/or any other pre-existing data available from publicly-available database, website, platform, literature, etc. The ML platform 920 can implement feature engineering 924 based on the ML training 922 and accommodate data extraction and screening module 912, combined with simulation platform 902. Finally, the ML platform 920 can generate one or more ML predictions 924 based on the feature engineering 924 and the materials design and selection module 914 using a trained model (such as via the ML training 922). The system 900 can be used to screen any number of materials based on appropriate screening criteria.

The screening strategy in one example employed the following criteria to identify new anode materials: (a) stability/synthesizability; (b) conductivity (band gap); (c) voltage (discharge potential); (d) practicality; (e) reversibility; (f) over-lithiation; (g) decomposition; and (h) capacity. The screening strategy that can be employed is shown in FIG. 11, which shows an exemplary screening process 1020. The screening process 1020 described herein is one exemplary screening process that can be implemented by the system 900. In other examples, certain screening steps of the screening process 1020 may be modified, and the screening process 1020 may implement the steps in an order that differs from the order shown in FIG. 11. In one or more examples, the steps of the screening process 1020 can be performed simultaneously rather than sequentially. Accordingly, the screening process 1020, including the screening criteria implemented in this example, should not be construed as limiting, as the system 900 can be used implement any number of data-driven screening methodologies.

In one or more examples, the screening process 1020 begins at step 1022 with amassing an initial data set 1022. The initial data set can be based on the particular type of material desired, that can start from dataset containing experimentally synthesized materials (>30,000 compounds) and hypothetical prototype materials (>250,000 compounds). For instance, for anode materials, the screening process 1020 can exact a particular material containing lithium. In this example, the initial data set included 18,000 Li-bearing compounds. Using the extensive screening process 1020, this data set was screened to identify suitable compounds, including the following top five compounds, most suitable for this exemplary target application: $Li_2CaSi$, $Li_2MgGa$, $Li_2AlAg$, $Li_2MgSi$, $Li_2AlGa$.

After amassing the initial data set 1022, the screening process 1020 can move to step 1024 and screen these materials based on desired compound formula. In this example, the initial data set was screened to include 906 materials that can be combined to form a material with the compound formula Li—X—Y.

Figure 12A:
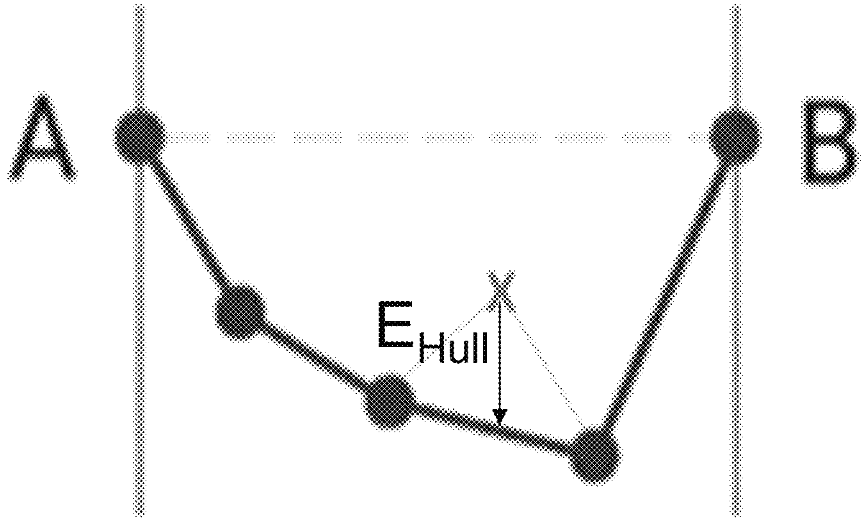
FIG. 12A illustrates an exemplary graphical depiction of hull distance in accordance with some embodiments disclosed herein.

After screening based on compound formula at step 1024, the screening process 1020 and screen materials based on synthesizability. Thermodynamic stability (e.g., synthesizability) is quantified based on the energy of the compound above the convex hull ($E_{hull}$) in the chemical space of the elements that make up the material, and such data is readily acquired from a materials database (such as a materials database stored in the data storage 910 of the simulation platform 902 of FIG. 10). An exemplary graphical depiction of hull distance is shown in FIG. 12A. A compound with $E_{hull}$=O lies in the energy convex hull and is a thermodynamically stable phase at T=0 K. A compound with $E_{hull}$>O is thermodynamically metastable and a material with a high energy above hull (e.g., >50 meV/atom) may have a strong driving force to decomposition and would be difficult to synthesize experimentally. Compounds with $E_{hull}$≤25 meV is nearly stable and has a very high likely successful to be stabilized at room temperature, where the thermal energy, $k_BT$, at room temperature is 25.7 meV. Here, $k_B$ is the Boltzmann constant ($8.617333262\times10^{-5}$ eV/K) and T is the temperature (here, room temperature, 298.15 K). The value of $k_BT$ is referring to the probability of finding a system in a state of energy E, given that it is in a surrounding environment at temperature T. In other words, if the value of $E_{hull}$ is less than about 25 meV/atom, there is a likelihood to find the corresponding compound at room temperature (i.e., 25° C.).

Figure 12B:
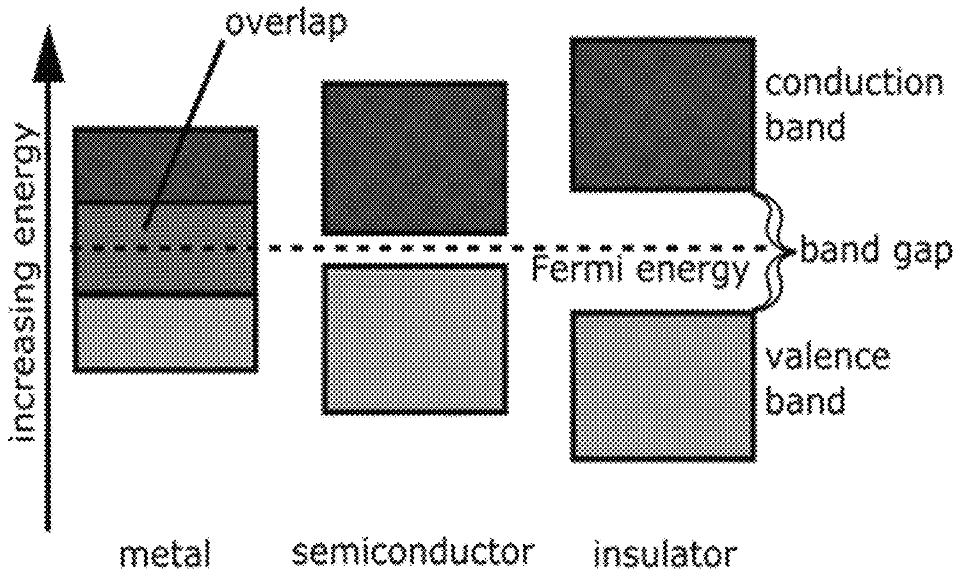
FIG. 12B illustrates an exemplary graphical depiction of band gap in accordance with some embodiments disclosed herein.

After screening based on synthesizability at step 1026, the screening process 1020 can move to step 1028 and screen materials based on conductivity. Conductivity can be measured based on the bandgap ($E_g$), which is the minimum energy required to excite an electron from its bound state into a free state where it can participate in conduction. An exemplary graphical depiction of band gap is shown in FIG. 12B. The band gap of a particular material exists in the space between the conduction band and the valence band. For metallic materials, there is zero bandgap, which is shown in FIG. 12B by the overlap. Semiconductor materials have a bandgap separating their conduction and valence band; however, this band gap is smaller than the bandgap of insulator materials. Accordingly, a semiconductor material requires less energy to excite the material from the valence band to the conduction band (e.g., to jump the bandgap), relative to an insulator material. As noted above, for anode materials, it is important that the compound has a bandgap that corresponds to either a zero bandgap (metallic) or semi-conducting (i.e., less than about 1.2 eV), or any Æg value in between 0 to 1.2 eV. Some other type of definitions such as semi-metal may be found, which represent materials with less than about 0.5 eV. Accordingly, in this example, compounds with $E_g$≤1.2 eV were identified as suitable compounds for our anode application. The most commonly used graphite anode material has a zero bandgap (metallic), while the next-generation Silicon anode material has a bandgap around 1.12 eV (semiconducting).

After screening based on conductivity at step 1028, the screening process 1020 can move to step 1030 and screen materials based on voltage. The potential (voltage) at which an ion is deposited or discharged is the discharge potential of the ion, which is essentially the tendency of an ion to gain electrons and in turn lose electrons. In this example, compounds with a discharge potential between 0 to about 0.4 V vs. $Li/Li^+$ were deemed suitable compounds. Generally, graphite has a potential about 0.2 V vs. $Li/Li^+$. Thus, a cathode that has 3.5 V vs. $Li/Li^+$ will have about 3.3 V vs. graphite. As the cell voltage is simply the potential difference between anode and cathode component, the voltage variation upon modifying the anode component is therefore expected.

After screening based on voltage at 1030, the screening process 1020 can move to step 1032 and screen materials based on practicality. Practicality considerations can include removing expensive, noble element-containing compounds (e.g., Ir, Pt, Os, Rh, Au, Pd, Ru, etc.), removing rare earth elements (e.g., TI, Tb, Gd, Sm, Ho, Yb, Nd, Pr, Pm, Ac, Lu, Tm, Eu, Ac, Dy, Er, etc.), removing toxic, radioactive elements (e.g., Pb, Hg, Th, Cd, Tc, Be, etc.), removing polymorphic compounds (e.g., $Li_2MgSi$, etc.), etc. In this example, prior to screening based on practicality, 185 Li—X—Y compounds were identified that were thermodynamically stable ($E_{hull}$≤25 meV), sufficiently conductive ($E_g$≤1.2 eV) and to exhibit suitable discharge potential (0 to 0.4 V vs. $Li/Li^+$). These 185 Li—X—Y compounds were screened down to 40 compounds based on practicality considerations. While some of these compounds were removed in order to identify new commercially-viable intermetallic, top-tier compounds, a small amount of doping (<less than 5 mol %) or element substitution (greater than 5 mol % and less than 25 mol %) may be utilized, if necessary.

After screening based on practicality at step 1032, the screening process 1020 can move to step 1034 and screen materials based on reversibility reactions. Compounds with irreversible reactions were screened out, which include reactions wherein the reaction product is not the same as the starting species. For example, the compound LiCaSn can exhibit the following reaction: $0.667\ Li^+ 0.33\ CaSn \rightarrow 0.333\ Li_2CaSn$, wherein the reaction product ($Li_2CaSn$) differs from the starting species (LiCaSn). When screening for reversibility, 10 compounds were screened out due to having irreversible reactions (e.g., $LiCo_2Ge$, $Li_2Y_5In_9$, $LiSi_2B$, etc.).

After screening based on reversibility at step 1034, the screening process 1020 can move to step 1036 and categorize materials based on over-lithiation. As noted above, a compound may become over-lithiated if it is capable of reaction with additional Lit ions relative to its equilibrium reaction. For example, after the compound $LiY_2Al$ reaches equilibrium, the reaction stops and the compound does not further react with additional lithium. In contrast, the compound $BaLi_2Si$ continues to react with additional Lit ions, meaning reactions with this compound may not be reversible. In this example, categorizing materials based on over-lithiation simply meant categorizing materials as either a first type, prone to over-lithiation ("over-lithiation"), or a second type, not prone to over-lithiation ("no over-lithiation").

After categorizing materials based on over-lithiation at step 1036, the screening process 1020 can move to step 1038 and categorize materials based on decomposition. With respect to chemical decomposition of de-lithiated species, certain de-lithiated compounds (i.e., the X—Y form of an Li—X—Y compound) can be stable (not susceptible to continued decomposition), whereas other were susceptible to further decomposition. For instance, the compound $LiY_2Al$ in its de-lithiated form is $Y_2Al$, which is stable and not susceptible to further decomposition. In contrast, the compound $LiAlNi_2$ in its de-lithiated form is $AlNi_2$, which may further decompose to other species, meaning this decomposition reaction may not be reversible. In this example, categorizing materials based on decomposition meant categorizing materials as either a first type, prone to further decomposition ("decomposition"), or not prone to further decomposition ("no decomposition"). Accordingly, the compounds screened according to the screening process 1020 were categorized into four types, as shown in Table 1, below.

TABLE 1

Compound Types.

| | No Over-lithiation | Over-lithiation |
|---|---|---|
| No Decomposition | Type 1 | Type 2 |
| Decomposition (may decompose) | Type 3 | Type 4 |

Eleven Type 1 compounds were identified, which are stable in both the lithiated form (Li—X—Y) and de-lithiated form (X—Y). The Type 1 compounds do not react with additional Lit ions in the lithiated form and are not susceptible to decomposing further in the de-lithiated form. The de-lithiated forms of the Type 1 compounds can be synthesized and receive Lit ions from cathodes. The Type 1 compounds are shown in Table 2, below.

TABLE 2

Type 1 Compounds.

| Compound | $E_g$ | $E_{hull}$ | Reduction Potential | Oxidation Potential | $Li^+$ ion Reaction | $E_{rxn}$ |
|---|---|---|---|---|---|---|
| $LiY_2Al$ | 0.000 | 0.000 | 0.00 | 0.03 | 0.5 Li + 0.5 $Y_2Al$ ↔ 0.5 $LiY_2Al$ | −0.006 |
| $Li_2CaSi$ | 0.000 | 0.000 | 0.01 | 0.09 | 0.667 Li + 0.333 CaSi ↔ 0.333 $Li_2CaSi$ | −0.050 |
| $Li_2LaIn$ | 0.000 | 0.000 | 0.00 | 0.12 | 0.667 Li + 0.333 LaIn ↔ 0.333 $Li_2LaIn$ | −0.061 |
| $Li_2YIn$ | 0.000 | 0.000 | 0.00 | 0.13 | 0.667 Li + 0.333 YIn ↔ 0.333 $Li_2YIn$ | −0.064 |
| LiYSi | 0.000 | 0.000 | 0.00 | 0.13 | 0.5 Li + 0.5 YSi ↔ 0.5 LiYSi | −0.045 |
| $Li_2LaSn$ | 0.000 | 0.000 | 0.00 | 0.16 | 0.667 Li + 0.333 LaSn + 0.333 $Li_2LaSn$ | −0.089 |
| $Li_2SrSn$ | 0.000 | 0.000 | 0.00 | 0.27 | 0.667 Li + 0.333 SrSn ↔ 0.333 $Li_2SrSn$ | −0.135 |
| $LiGaNi_2$ | 0.000 | 0.000 | 0.00 | 0.30 | 0.5 Li + 0.5 $GaNi_2$ ↔ 0.5 $LiGaNi_2$ | −0.091 |
| $LiCo_2Si$ | 0.000 | 0.000 | 0.00 | 0.31 | 0.5 Li + 0.5 $Co_2Si$ ↔ 0.5 $LiCo_2Si$ | −0.079 |
| $Li_2CaSn$ | 0.000 | 0.000 | 0.00 | 0.34 | 0.667 Li + 0.333 CaSn ↔ 0.333 $Li_2CaSn$ | −0.184 |
| $LiSiNi_2$ | 0.000 | 0.000 | 0.00 | 0.38 | 0.5 Li + 0.5 $SiNi_2$ ↔ 0.5 $LiSiNi_2$ | −0.095 |

Three Type 2 compounds were identified, which are stable in the de-lithiated form (X—Y), meaning they will not decompose, but susceptible to over-lithiation in the lithiated form (Li—X—Y). The Type 2 compounds are shown in Table 3, below.

TABLE 3

Type 2 Compounds.

| Compound | $E_g$ | $E_{hull}$ | Reduction Potential | Oxidation Potential | $Li^+$ ion Reaction | $E_{rxn}$ |
|---|---|---|---|---|---|---|
| $Li_2BaSi$ | 0.000 | 0.000 | 0.04 | 0.13 | 0.667 Li + 0.333 BaSi ↔ 0.333 $BaLi_2Si$ | −0.064 |
| $Li_2MgGa$ | 0.000 | 0.000 | 0.07 | 0.21 | 0.667 Li + 0.333 MgGa ↔ 0.333 $Li_2MgGa$ | −0.163 |
| $Li_2GaCu_3$ | 0.000 | 0.000 | 0.03 | 0.22 | 0.667 Li + 0.333 $GaCu_3$ ↔ 0.333 $Li_2GaCu_3$ | −0.104 |

TABLE 4

Over-lithiation Reactions, Type 2 Compounds.

| Compound | Over-lithiation Reaction | $E_{rxn}$ |
|---|---|---|
| $Li_2BaSi$ | 0.688 Li + 0.312 $BaLi_2Si$ → 0.062 $Li_{21}Si_5$ + 0.312 Ba | −0.013 |
| $Li_2MgGa$ | 0.5 Li + 0.5 Li2MgGa → 0.5 LiMg + 0.5 $Li_2Ga$ | −0.013 |
| $Li_2GaCu_3$ | 0.5 Li + 0.5 $Li2GaCu_3$ → 0.5 $Li_2Ga$ + 0.5 $LiCu_3$ | −0.005 |

The root cause of over-lithiation is volume expansion (like Si anodes), which presents the risk of irreversible capacity loss. Although the Type 2 compounds can be susceptible to over-lithiation, meaning they tend to react with additional Lit ions in the over-lithiated form, this can be prevented by various mitigation methods. Table 3 shows the reduction potential, above this potential, it is expected that over-lithiation will not take place. For all three compounds in Table 3, they are less than 0.1 V vs. Li/Lit, which is desirable. Another method may include surface-treatment of the Type 2 compounds susceptible to over-lithiation with another material (i.e., coating) such as using a carbon coating and/or other materials attracting Lit ions. If reversibility is not an issue during over-lithiation but the electrode volume change is severe, this may be further incorporated into a nanoporous structure, as discussed above.

Eleven Type 3 Compounds were identified, which are stable in the lithiated form (Li—X—Y), meaning they do not react with additional Lit ions in the lithiated form, but susceptible to decomposition in the de-lithiated form. The Type 3 compounds are shown in Table 5, below.

TABLE 5

Type 3 Compounds.

| Compound | $E_g$ | $E_{hull}$ | Reduction Potential | Oxidation Potential | $Li^+$ ion Reaction | $E_{rxn}$ |
|---|---|---|---|---|---|---|
| $Li_{13}Ba_{19}Na_{29}$ | 0.015 | 0.000 | 0.00 | 0.02 | 0.929 Li + 0.071 $Ba_{19}Na_{29}$ ↔ 0.071 $Ba_{19}Na_{29}Li_{13}$ | −0.004 |
| $LiAlNi_2$ | 0.000 | 0.000 | 0.00 | 0.02 | 0.5 Li + 0.5 $AlNi_2$ ↔ 0.5 $LiAlNi_2$ | −0.021 |
| $LiCa_2Ga$ | 0.000 | 0.000 | 0.00 | 0.02 | 0.5 Li + 0.5 $Ca_2Ga$ ↔ 0.5 $LiCa_2Ga$ | −0.006 |
| $LiCa_2Al$ | 0.000 | 0.000 | 0.00 | 0.02 | 0.5 Li + 0.5 $Ca_2Al$ ↔ 0.5 $LiCa_2Al$ | −0.006 |
| $LiZnNi_2$ | 0.000 | 0.000 | 0.00 | 0.05 | 0.5 Li + 0.5 $ZnNi_2$ ↔ 0.5 $LiZnNi_2$ | −0.012 |
| $LiCa_2In$ | 0.000 | 0.000 | 0.00 | 0.11 | 0.5 Li + 0.5 $Ca_2In$ ↔ 0.5 $LiCa_2In$ | −0.030 |
| $LiAlCu_2$ | 0.000 | 0.000 | 0.00 | 0.26 | 0.5 Li + 0.5 $AlCu_2$ ↔ 0.5 $LiAlCu_2$ | −0.064 |
| $Li_2Ce_2Si_3$ | 0.000 | 0.000 | 0.00 | 0.28 | 0.667 Li + 0.333 $Ce_2Si_3$ ↔ 0.333 $Li_2Ce_2Si_3$ | −0.147 |
| $Li_2ZnCu_3$ | 0.000 | 0.000 | 0.00 | 0.28 | 0.667 Li + 0.333 $ZnCu_3$ ↔ 0.333 $Li_2ZnCu_3$ | −0.109 |
| $LiAl_2Ni$ | 0.000 | 0.000 | 0.00 | 0.32 | 0.5 Li + 0.5 $Al_2Ni$ ↔ 0.5 $LiAl_2Ni$ | −0.080 |
| $LiZn_2Ni$ | 0.000 | 0.000 | 0.00 | 0.36 | 0.5 Li + 0.5 $Zn_2Ni$ ↔ 0.5 $LiZn_2Ni$ | −0.090 |

In the de-lithiated form, the Type 3 compounds decompose further to more stable phase mixtures. Unlike the Type 1 and Type 2 compounds, the Type 3 de-lithiated compounds are more difficult to synthesize (i.e., they may decompose to more stable phase mixtures); therefore, synthesizing the lithiated form of the Type 3 compounds (Li—X—Y) would be more desirable and easier. Starting with the lithiated version of the Type 3 compounds, the de-lithiated version of the compound may not decompose if electrochemically stable. One known example is $LiFePO_4$ and $FePO_4$ reaction that is commonly used in Lit ion battery cathode. When $LifePO_4$ is de-lithiated in a battery cell that has an Olivine (Orthorhombic) structure, its de-lithiated $FePO_4$ also retains an Olivine structure. These type of $LifePO_4$—$FePO_4$ reaction can reversibly take place for more than 3,000 cycles (assuming 1 charge/discharge per day, this translates to about 8+year of battery lifetime). While the Olivine-type Orthorhombic $FePO^+$ structure is "observable" within an electrochemical cell, this is not the ground state structure and difficult to be experimentally synthesized in its de-lithiated Olivine form. Rather, the ground state of $FePO_4$ is quartz (alpha)—derived structure that crystallizes in the tetragonal space group. Therefore, we expect the Type 3 compounds, if synthesized in its lithiated (Li—X—Y) form, we expect a good reversibility with its de-lithiated X—Y form, if electrochemically stable within a battery cell.

TABLE 6

Decomposition Reaction of De-lithiated Type 3 Compounds.

| Compound | De-lithiated Compound | Decomposition Reaction of X-Y Compound |
|---|---|---|
| $Li_{13}Ba_{19}Na_{29}$ | $Ba_{19}Na_{29}$ | $Ba_{19}Na_{29}$ → 10 $BaNa_2$ + 9 BaNa |
| $LiAlNi_2$ | $AlNi_2$ | $AlNi_2$ → 0.25 $Al_3Ni_5$ + 0.25 $AlNi_3$ |

TABLE 6-continued

Decomposition Reaction of De-lithiated Type 3 Compounds.

| Compound | De-lithiated Compound | Decomposition Reaction of X-Y Compound |
|---|---|---|
| $LiCa_2Ga$ | $Ca_2Ga$ | $Ca_2Ga$ → 0.353 CaGa + 0.059 $Ca_{28}Ga_{11}$ |
| $LiCa_2Al$ | $Ca_2Al$ | $Ca_2Al$ → 0.231 $Ca_8Al_3$ + 0.154 $CaAl_2$ |
| $LiZnNi_2$ | $ZnNi_2$ | $ZnNi_2$ → ZnNi + Ni |
| $LiCa_2In$ | $Ca_2In$ | $Ca_2In$ → 0.2 $Ca_8In_3$ + 0.4 CaIn |
| $LiAlCu_2$ | $AlCu_2$ | $AlCu_2$ → 0.2 AlCu + 0.2 $Al_4Cu_9$ |
| $Li_2Ce_2Si_3$ | $Ce_2Si_3$ | $Ce_2Si_3$ → CeSi + $CeSi_2$ |
| $Li_2ZnCu_3$ | $ZnCu_3$ | $ZnCu_3$ → 2 Cu + ZnCu |
| $LiAl_2Ni$ | $Al_2Ni$ | $Al_2Ni$ → 0.333 $Al_3Ni$ + 0.333 $Al_3Ni_2$ |
| $LiZn_2Ni$ | $Zn_2Ni$ | $Zn_2Ni$ → 0.027 $Zn_{53}Ni_{16}$ + 0.568 ZnNi |

Five Type 4 compounds were identified, which are not stable in either the over-lithiated form or the de-lithiated form (X—Y). It is found that the Type 4 compounds are thus susceptible to reacting with additional $Li^+$ ions to form the over-lithiated form (Similar to Type 2), and to chemically-decomposing further in the de-lithiated form if prepared in de-lithiated form (Similar to Type 3). Like the Type 3 compounds, it may not be most desired to synthesize the Type 4 compounds as the de-lithiated version; but it would be easier to make the lithiated version of the Type 4 compounds (Li—X—Y). The Type 4 compounds are shown in Table 7, below.

TABLE 7

| Type 4 Compounds. | | | | | | |
|---|---|---|---|---|---|---|
| Compound | $E_g$ | $E_{hull}$ | Reduction Potential | Oxidation Potential | $Li^+$ ion Reaction | $E_{rxn}$ |
| $Li_2AlAg$ | 0.000 | 0.000 | 0.05 | 0.30 | 0.667 Li + 0.333 AlAg $\leftrightarrow$ 0.333 $Li_2AlAg$ | −0.225 |
| $LiMg_2Zn$ | 0.000 | 0.000 | 0.06 | 0.30 | 0.5 Li + 0.5 $Mg_2Zn$ $\leftrightarrow$ 0.5 $LiMg_2Zn$ | −0.096 |
| $LiMg_2Ag$ | 0.000 | 0.000 | 0.00 | 0.34 | 0.5 Li + 0.5 $Mg_2Ag$ $\leftrightarrow$ 0.5 $LiMg_2Ag$ | −0.094 |
| $Li_2MgSi$ | 0.000 | 0.025 | 0.16 | 0.36 | 0.667 Li + 0.333 MgSi $\leftrightarrow$ 0.333 $Li_2MgSi$ | −0.229 |
| $Li_2AlGa$ | 0.000 | 0.000 | 0.26 | 0.40 | 0.667 Li + 0.333 AlGa $\leftrightarrow$ 0.333 $Li_2AlGa$ | −0.260 |

TABLE 8

| Over-lithiation Reaction, Type 4 Compounds. | | |
|---|---|---|
| Compound | Over-lithiation Reaction | $E_{rxn}$ |
| $Li_2AlAg$ | 0.75 Li + 0.25 $Li_2AlAg$ $\rightarrow$ 0.25 $Li_2Al$ + 0.25 $Li_3Ag$ | −0.020 |
| $LiMg_2Zn$ | 0.667 Li + 0.333 $LiMg_2Zn$ $\rightarrow$ 0.667 LiMg + 0.333 LiZn | −0.021 |
| $LiMg_2Ag$ | 0.889 Li + 0.111 $LiMg_2Ag$ $\rightarrow$ 0.222 $Li_3Mg$ + 0.111 $Li_3Ag$ | −0.003 |
| $Li_2MgSi$ | 0.692 Li + 0.308 $Li_2MgSi$ $\rightarrow$ 0.231 LiMg + 0.077 $Li_{14}MgSi_4$ | −0.048 |
| $Li_2AlGa$ | 0.6 Li + 0.4 $Li_2AlGa$ $\rightarrow$ 0.4 $Li_2Ga$ + 0.2 $Li_3Al_2$ | −0.059 |

The tendency to accept additional Lit ions in the lithiated form can result with the Type 4 compounds having a higher capacity; however, the over-lithiation reaction may be irreversible. To prevent irreversibility, each material of the compound should not be reduced below its reduction potential, similar to Type 2 Compounds. For example, $Li_2AlAg$ should not be reduced below its reduction potential of 0.05 V. Similar to the Type 3 compounds, the lithiated form (Li—X—Y) of the Type 4 compounds would be easier to experimentally synthesize. As described for the Type 3 compounds, the de-lithiated version of the Type 4 compounds may not decompose if electrochemically stable within the battery cell.

Referring now back to FIG. 11, after categorizing the materials based on step 1038 and step 1036, the screening process 1020 can move to step 1034 and screen the remaining list of materials based on capacity. Theoretical capacity is the amount of throughput that could be attained if a production facility were able to produce at its peak efficiency level with no downtime. In this example, the theoretical capacity of each the remaining screened compounds was compared to the theoretical capacity of graphite to identify five compounds with a greater theoretical capacity than graphite, which are bolded in the below table.

TABLE 9

| Capacity of Screened Materials. | | | |
|---|---|---|---|
| | Compound | $MW-M_1M_2$ | Theoretical Capacity ($mAh\ g^{-1}$) |
| Type 1 | $LiY_2Al$ | 204.79 | 131 |
| | **$Li_2CaSi$** | **68.17** | **786** |
| | $Li_2LaIn$ | 253.73 | 211 |
| | $Li_2YIn$ | 203.73 | 263 |
| | LiYSi | 116.99 | 229 |

TABLE 9-continued

| Capacity of Screened Materials. | | | |
|---|---|---|---|
| | Compound | $MW-M_1M_2$ | Theoretical Capacity ($mAh\ g^{-1}$) |
| | $Li_2LaSn$ | 257.62 | 208 |
| | $Li_2SrSn$ | 206.33 | 260 |
| | $LiGaNi_2$ | 187.11 | 143 |
| | $LiCo_2Si$ | 145.95 | 184 |
| | $Li_2CaSn$ | 158.79 | 338 |
| | $LiSiNi_2$ | 145.47 | 184 |
| Type 2 | $Li_2BaSi$ | 165.41 | 324 |
| | **$Li_2MgGa$** | **94.03** | **570** |
| | $Li_2GaCu_3$ | 260.36 | 206 |
| Type 3 | $Li_{13}Ba_{19}Na_{29}$ | 3275.93 | 106 |
| | $LiAlNi_2$ | 144.37 | 186 |
| | $LiCa_2Ga$ | 149.88 | 179 |
| | $LiCa_2Al$ | 107.14 | 250 |
| | $LiZnNi_2$ | 182.78 | 147 |
| | $LiCa_2In$ | 194.98 | 137 |
| | $LiAlCu_2$ | 154.07 | 174 |
| | $Li_2Ce_2Si_3$ | 364.49 | 147 |
| | $Li_2ZnCu_3$ | 256.03 | 209 |
| | $LiAl_2Ni$ | 112.66 | 238 |
| | $LiZn_2Ni$ | 189.47 | 141 |
| Type 4 | **$Li_2AlAg$** | **134.85** | **398** |
| | $LiMg_2Zn$ | 114.00 | 235 |
| | $LiMg_2Ag$ | 156.48 | 171 |
| | **$Li_2MgSi$** | **52.39** | **1023** |
| | **$Li_2AlGa$** | **96.71** | **554** |
| Graphite | $LiC_6$ | 72.06 | 372 |
| Si anode | $Li_{4.4}Si$ | 28.09 | 4198 |

Figure 13:
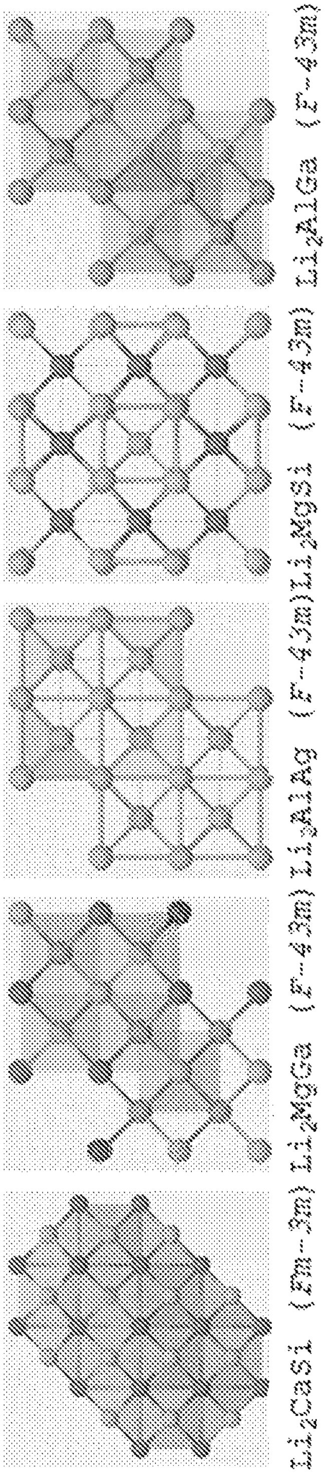
FIG. 13 illustrates exemplary compounds used in anode materials of various embodiments disclosed herein.
Figure 14A:
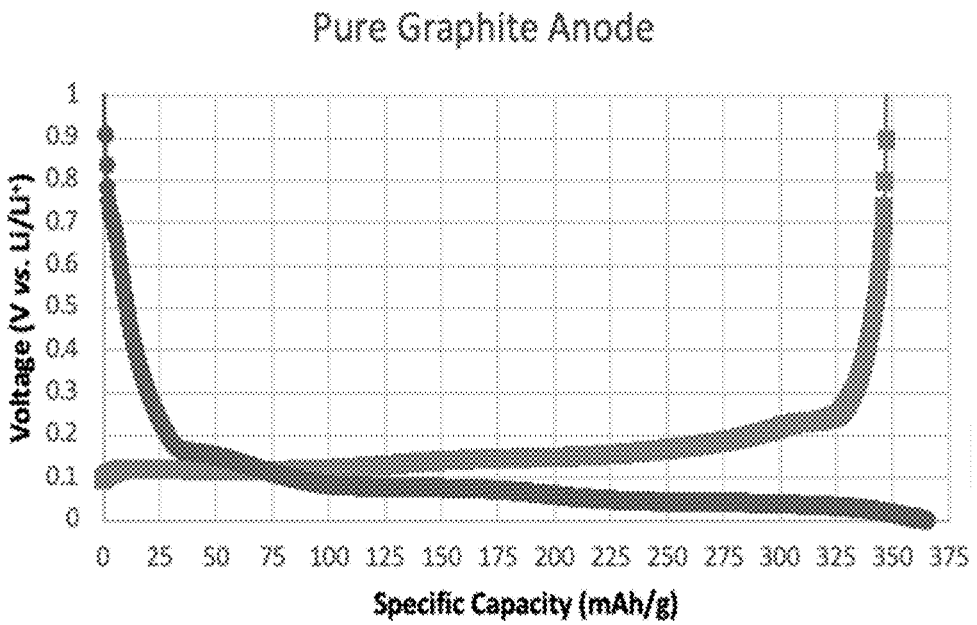
FIG. 14A illustrates the voltage profile of graphite anode electrode in accordance with some embodiments disclosed herein.

The five identified compounds, $Li_2CaSi$, $Li_2MgGa$, $Li_2AlAg$, $Li_2MgSi$, $Li_2AlGa$, are shown in FIG. 13, were identified as the top intermetallic anode candidates according to the above disclosure. The predicted theoretical capacity of these new intermetallic materials is compared to graphite materials that has a theoretical capacity of 372 mAh/g. The voltage profile of graphite is shown in FIG. 14A in a pouch type cell format, where the average voltage plateau is located around 0.2 V vs. Li/Lit. The calculated theoretical capacity shown in Table 9 only considers the reversible reaction between Li—X—Y and X—Y, but does not consider the over-lithiation reaction. It may be possible to increase the calculated theoretical capacity for the Type 2 and Type 4 compounds, if over-lithiation is being considered. For example, Si anode materials go through a conversion-type of reaction, over-lithiating up to 4.4 Li per Si atom ($Li_{4.4}Si$, or $Li_{22}Sis$). Table 4 (Type 2 Compounds) and Table 8 (Type 4 Compounds) do show some of known conversion type of anode materials including but not limited to $Lin_4MgSi_4$, $Li_3Mg$, $Li_{21}Si_5$, etc. hinting at additional Li capacity reservoir for the new intermetallic anode materials.

Figure 14B:
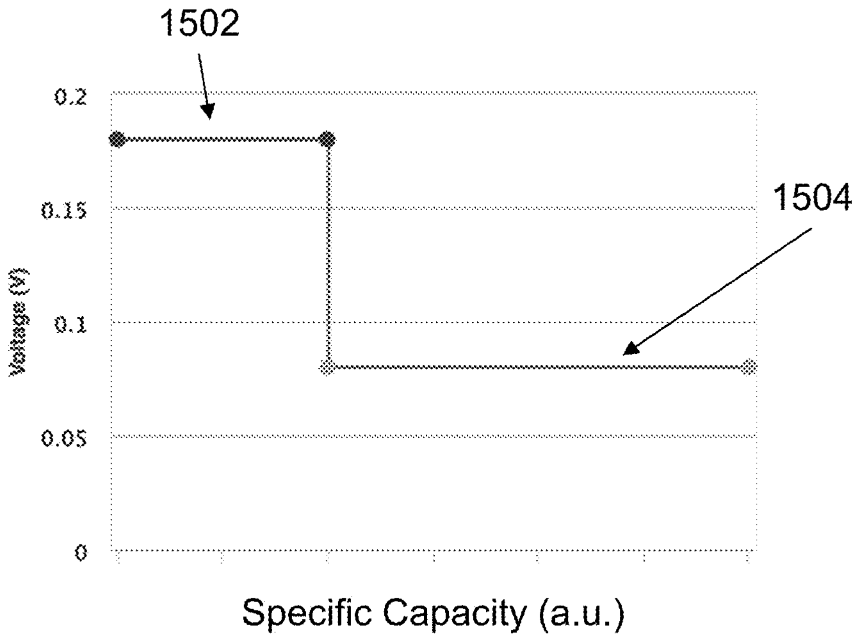
FIG. 14B illustrates the voltage profile an exemplary intermetallic compound in accordance with some embodiments disclosed herein.

FIG. 14B shows a representative voltage curve that is calculated for new Li—X—Y compounds. The first region 1502, at around 0.17 V vs. Li/Lit shows a fully reversible redox reaction ("conservative" calculation of theoretical capacity), without going through a conversion-type of reaction such as Si-based anode materials. As shown in FIG. 14B, the X-axis is represented using "a.u.," which corresponds to Arbitrary Unit. This is because the first region 1502 and the second region 1504 represent specific capacities that are material-dependent, and thus may change based on the material. In addition, the voltage values associated with the first region 1502 and the second region 1504 may also be material-dependent and subject to change. In one or more examples, the theoretical specific capacity range of the first region 1502 can range from 0 mAh/g to about 1,025 mAh/g. Upon over-lithiation, the practical capacity of new intermetallic anode may increase significantly, shown in the second region 1504, around 0.07 V vs. Li/Lit. In one or more examples, the theoretical specific capacity range of the second region 1504 can range from 0 to about 4,000 mAh/g. One non-limiting example includes a Si-containing intermetallic anode material going through a conversion-type of electrochemical reaction (i.e., such as $Li_{4.4}Si$), it may be able to approach the capacity of Si anode materials (i.e., 4198 mAh/g). The ratio between the first plateau and the second plateau may be 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, depending on the chemical formula, decomposition, and voltage cutoff of anode materials.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A negative electrode comprising:

an anode material comprising a compound of formula $Li_2$—X—Y; and one or more additional materials selected from the group consisting of C, Si, SiC, and $SiO_{x1}$ wherein x1 is less than or equal to 2;

wherein: X and Y are each independently a metal atom or a metalloid atom, and the anode material has a discharge potential of between 0 to about 0.4 V vs. $Li/Li^+$, and the molar ratio of Li:X:Y is 2:1:1; and wherein the anode material is coated with a layer of carbon.

2. The negative electrode of claim 1, wherein X is Ca, Mg, or Al.

3. The negative electrode of claim 1, wherein Y is Si, Ga, or Ag.

4. The negative electrode of claim 1, wherein X is Ca, Mg, or Al;

and Y is Si, Ga, or Ag.

5. The negative electrode of claim 1, wherein the compound is $Li_2CaSi$, $Li_2MgGa$, or $Li_2AlAg$.

6. The negative electrode of claim 1, wherein X is Mg or Al.

7. The negative electrode of claim 1, wherein Y is Si or Ga.

8. The negative electrode of claim 1, wherein the compound is $Li_2MgSi$, or $Li_2AlGa$.

9. The negative electrode of claim 1, wherein the anode material has a discharge potential of between 0 to about 0.1 V vs. $Li/Li^+$.

10. The negative electrode of claim 1, wherein the compound has a cubic unit cell.

11. The negative electrode of claim 10, wherein the cubic unit cell has an Fm3m or F43m space group.

12. The negative electrode of claim 1, wherein the energy above the convex hull (Ehull) of the compound is less than about 25 meV/atom.

13. The negative electrode of claim 1, wherein the compound has a bandgap (Eg) of less than about 1.2 eV.

14. The negative electrode of claim 1, wherein the anode material has a theoretical capacity of greater than about 372 mA h/g.

15. The negative electrode of claim 1, wherein the anode material does not comprise an over-lithiated form of the compound.

16. The negative electrode of claim 1, wherein the compound is susceptible to side decomposition reactions upon discharging.

17. The negative electrode of claim 1, wherein the one or more additional materials is Si.

18. The negative electrode of claim 1, wherein the one or more additional materials is SiC.

19. The negative electrode of claim 1, wherein the one or more additional materials is $SiO_{x1}$.

* * * * *